United States Patent [19]
Gruenberg

[11] 3,757,335
[45] Sept. 4, 1973

[54] COMMUNICATION AND CONTROL SYSTEM

[75] Inventor: Elliot L. Gruenberg, Hartsdale, N.Y.

[73] Assignee: International Business Machines Corporation, Armonk, N.Y.

[22] Filed: Feb. 29, 1968

[21] Appl. No.: 710,711

[52] U.S. Cl. .......... 343/100 TD, 325/4, 343/100 CS
[51] Int. Cl. .......... G01s 3/42
[58] Field of Search .......... 343/100 CS, 100.6 R, 343/117 A; 325/4, 5, 14

[56] References Cited

UNITED STATES PATENTS

| | | | |
|---|---|---|---|
| 1,924,174 | 8/1933 | Wolf | 343/13 |
| 2,140,130 | 12/1938 | Earp | 343/100.6 R |
| 2,908,002 | 10/1959 | Van Atta | 343/100.6 R |
| 3,150,320 | 9/1964 | Gruenberg | 343/100.6 R |

OTHER PUBLICATIONS

Andre et al., "An Active Retrodirective Array for Satellite Communications," IEEE Trans. On Antennas and Propagation, March, 1964, pp. 181 to 186.

*Primary Examiner*—Benjamin A. Borchelt
*Assistant Examiner*—Richard E. Berger
*Attorney*—Hanifin and Jancin and Bernard N. Wiener

[57] ABSTRACT

A retrodirective oscillating loop for a communication and control channel is disclosed for the transmission and reception of radiant energy waveforms between remotely located terminals wherein each terminal has a retrodirective property with respect to the waveform propagation in the channel. It is demonstrated herein that two retrodirective communications repeaters or terminals form a retrodirective oscillating loop if the signal transmitted by one terminal is received, sufficiently amplified, and transmitted back by the second terminal and again received, sufficiently amplified, and transmitted by the first terminal while remaining stationary in time. This provides an important capability for two retrodirective antenna array terminals of a retrodirective oscillating loop of automatically steering toward each other when each terminal is within the field of view of the other terminal. When a retrodirective oscillating loop is established between two remotely located antenna array terminals of an electromagnetic radiation spectrum communication and control channel, a carrier oscillation is initiated from the noise spectrum present in the apertures of each array when the input aperture of each terminal is within the field of view of the output aperture of the other terminal.

16 Claims, 20 Drawing Figures

INVENTOR
ELLIOT L. GRUENBERG

BY Bernard N. Wiener
ATTORNEY

LEGEND x—x—x EXTINCTION

⊙ ⊙ ⊙ AMPLIFIER GAIN FOR THRESHOLD

COMMUNICATION AND CONTROL SYSTEM

BACKGROUND OF THE INVENTION

This invention relates generally to a loop or link for a communication and control channel between a pair of remotely located antenna terminals via propagation of waveform energy in an intervening medium, and it relates more particularly to an oscillating loop or link wherein the relative bearings and respective spatial orientations of the antenna terminals may be arbitrarily determined.

It has not been possible heretofore to establish a communication and control channel between remotely located terminals via propagation of an energy waveform in an intervening medium where the terminals have arbitrarily determined respective orientations of their spatial axes and relative bearings to each other.

Of background interest for understanding the contribution of the present invention are the following literature references: U. S. Pat. No. 2,467,299 by L. Espenschied, presents a high frequency transmission system wherein two remotely located directive antenna terminals are caused to communicate with each other in a singing loop through a predetermined path between the terminals whose relative locations and respective orientations must be predetermined; U. S. Pat. No. 2,908,002 by L. C. Van Atta, for an electromagnetic reflector presents an antenna structure for electromagnetic radiation which provides a returned waveform with predetermined direction relative to a related incident wave; U. S. Pat. No. 3,150,320 by E. L. Gruenberg for a space satellite communications system employing a modulator reflector relay means which incorporates an antenna array of the Van Atta type with modulation means inserted in each connecting transmission path between conjugate or symmetrical antennas; and the article by C. C. Cutler et al. for a self-steering array repeater in THE BELL SYSTEM TECHNICAL JOURNAL, Sept. 1963, pages 2,013 et seq., whereby an antenna array is automatically directed by intermodulation of signal components. Further, The I.E.E.E. Transactions on Antennas and Propagation, Vol. AP–12, March 1964, presents several articles concerning retrodirective antenna arrays.

SUMMARY OF THE INVENTION

It has been discovered for the practice of this invention that a retrodirective oscillating loop can be initiated and stably sustained between two remotely located antenna terminals via electromagnetic carrier waveform radiation propagating therebetween if each terminal has a retrodirective antenna array property, and there is suitable energy gain in the system to overcome the inherent losses at each terminal and in the intervening medium through which the electromagnetic energy travels between the terminals. Further, the discovery for the practice of this invention has been determined to be applicable for a communication and control channel in a sonic medium, e.g., water, by sonic waveform propagation.

It is an object of this invention to provide an oscillating loop for a communication and control channel between remotely located terminals via waveform radiation in an intervening medium where the nature of the medium between the terminals and the relative bearings and respective spatial orientations are arbitrarily determined.

It is another object of this invention to provide a retrodirective oscillating loop of electromagnetic radiation carrer frequency for a communication and control channel between two remotely located antenna array terminals by establishing each of the terminals with a retrodirective property and with both electronic gain and antenna gain sufficient to exceed the system losses.

It is another object of this invention to provide a communication and control channel including two retrodirective antenna array terminals which are remotely located from each other effectively within the respective field of view of each other by including sufficient energy gain in a retrodirective oscillating loop within which the terminals are serially connected.

It is another object of this invention to provide a communication and control channel between two remotely located terminals with retrodirective properties for receiving and transmitting electromagnetic radiation including electronic circuitry for compensating for Doppler shift of frequencies in a retrodirective oscillating loop including the terminals.

It is another object of this invention to provide a system for measuring the distance between and relative bearing of two remotely located terminals with retrodirective properties.

Several advantages of the practice of this invention will now be discussed. This invention provides for automatic selection of directivity between two antenna terminals enhancing thereby the communications efficiently which can be achieved between two terminals without requiring that the antennas be steered toward each other. The power of transmission that is needed to send messages at a specific rate is reduced by the amount of antenna gain that each antenna can contribute when steered toward each other. Because the antenna gain implies narrow beams, there is significantly less interference than in transmission systems using omnidirectional transmission because the power is focused only between users. Furthermore, because of the lower power required to transmit the same message rate, the transmitting power expended by a user of the system is reduced substantially.

Because the transmitted intelligence is essentially confined to the beams that exist among users, there is a reduction in the detectability in these messages by an outsider not within the same line of travel of the intelligence. The limited detectability is similar to that of a microwave transmission link which is fixed in direction and sighted in. Therefore, privacy of communication is a result of the practice of this invention. Further, the operation of the communication link requires cooperativeness by the two parties, thereby making it easy to exclude other parties and making it also easy to require acknowledgement that the other party is indeed listening. The advantage of the automatic beam steering of the invention is particularly apparent when the terminals that are in communication are moving, e.g., airplanes and boats. These types of communicators do not have the necessity of locating the other party and have the flexibility of the prior art omnidirectional system. This flexibility is achieved with a directional property which increases the useful bandwidth over omnidirectional systems.

Automatic range and direction finding are readily accomplished by the practice of this invention. Because the system of the invention is cooperative, a timing signal modulated at one terminal is readily returned to the same terminal; and the time difference is a function of range. Because the retrodirective oscillation is directional, it provides an indication of the direction of the other party which can be readily measured. Further, the direction finding can readily be made unique to the particular parties in the system by determining the specific frequency of the direction finding.

Through the practice of this invention, random access is achieved in the communication and control from any direction. The autonomy of the terminals from the system control arises from spontaneous build up of direction between users. This requires no synchronization as well.

Reduction of fading in multipath communications is derived from the capability of a system according to this invention to suppress weaker signals which may be traversing longer paths.

This invention provides a retrodirective oscillating loop or link for a communication and control system. A carrier waveform for a retrodirective oscillating loop builds up between two remotely located antenna array terminals with retrodirective properties when sufficient amplification is provided in the loop to overcome losses which occur at the terminals and in the medium between them. The build up occurs stably when amplitude limiting of oscillations is provided. An important capability of the retrodirective antenna array terminals of a retrodirective oscillating loop is the property of automatically steering toward each other when each terminal is effectively within the field of view of the other terminal. The automatic steering property occurs because the retrodirective antenna develops its gain only if each of its multiple radiating antenna elements transmits the carrier waveform, except for a time or phase shift which is a function of the location of the radiating element within the antenna array. The gain of a retrodirective antenna is not available for the first half-cycle of the mode build-up, since the wave forms of the initiating noise of the array elements are independent.

The following is an explanation based on theoretical considerations of the physical mechanism by which a retrodirective oscillating loop is built up from a noise spectrum from each pair of retrodirective antenna array terminals of the loop.

When the retrodirective oscillating loop is first turned on, there is a noise output from each antenna element because of noise received by the associative receiving element and noise locally generated in each amplifier. Each of these noise outputs is considered to be independent of every other noise output. Therefore, the resultant noise output of each array is throughout its entire field of view. Part of the noise output is received by the other array of the loop at a much lower power level than the locally generated noise. Since the received noise can be considered as originating from a point source, it is coherent across the receiving aperture. The noise received from the other array of the retrodirective loop is returned in the direction from which it was received with the full gain of the array because of the linearity of the system at low power levels. This process continues until a carrier frequency is built up in the oscillating loop including the terminals A and B.

In greater detail, the theoretical omnidirectional noise radiation of an array of point noise sources consists initially of a large number of lobes. The noise components of every retrodirective array element contributes to a coherent radiation in the direction of the lobe which has the width of the retrodirective beam from the retrodirective antenna array. The number of lobes equals the gain factor of the array. The A retrodirective antenna array terminal of the retrodirective loop receives noise radiation during the initial half-cycle of mode build-up equivalent to the noise radiation from a single-feed antenna of the same gain as the retrodirective antenna array terminal B. Because the receiver terminal operates linearly, the received noise waveform at terminal A is reradiated retrodirectively at the full receiver terminal amplifier and antenna array gain independent of the noise level generated within the receiver terminal. Therefore, the full gain build-up of the retrodirective oscillating loop of this invention starts from a noise level which is below the initially radiated noise by the factor of the antenna array gain. The mode build-up time of a retrodirective array of a retrodirective oscillating loop is proportional to the number of array elements which in turn is approximately equal to the array gain.

Retrodirective oscillating loop circuits may develop maximum loop gain only if the carrier waveform experiences a phase shift of an integer number of cycles on a round trip around the loop. The circuitry should desirably not restrict the self-adjustability of optimum carrier frequency conditions or modes. However, circuits containing local oscillators for certain operational advantages impose constraints on the modes. Illustratively, the following are constraints imposed upon a retrodirective oscillating loop when local oscillators are included in loop circuitry:

a. An offset frequency oscillator included in each terminal causes the transmitted and received frequencies to differ and isolates the reception from the transmission at the same terminal.

b. A local oscillator at each terminal converts the carrier frequency to an intermediate frequency to achieve the required electronic gain and effective frequency filtering at the terminal.

c. Two amplifier circuits oscillating in different frequency channels and local oscillators for frequency conversion are included at each terminal of a retrodirective oscillating loop to increase the overall antenna gain and to permit use of each antenna element at each terminal for both reception and transmission.

d. Offset oscillators included in the retrodirective oscillating loop circuitry shift the frequency of the transmission in one direction into the negative spectrum with respect to the frequency of the reception in the other direction so that Doppler frequency shifts cancel, and insensitivity is achieved to changes in the distance between the terminals. This operation of a retrodirective oscillating loop is described in copending application Ser. No. 710,712 for Stabilized Communication and Control System U.S. Pat. by H. P. Raabe, filed on even date herewith and assigned to the assignee hereof.

A retrodirective oscillating loop provided by this invention usually incorporates control circuits for sustaining a stable mode of operation. For the operational circumstance of the terminals being stationary, the local oscillators at each remotely located retrodirective terminal may be synchronized with each other so that the phase that is added twice to the received carrier at one terminal is subtracted twice the full amount at the other terminal. A phase difference of many cycles can rapidly develop even though highly stable oscillators are incorporated in the retrodirective oscillating loop. An upward or downward shift of the mode frequency by one round trip frequency is achieved by the addition or removal of one cycle. Illustratively, the oscillation modes decay if there is a shift of the mode frequency to the upper or lower edge of the amplifier pass band where required loop gain is not available. The loop gain in the center of the amplifier pass band increases as the mode decays, and the nearest mode then builds up to the limiting level and in sequence shifts to the edge of the pass band and decays.

The foregoing and other objects, features, and advantages of the invention will be apparent from the following more particular description of preferred embodiments of the invention, as illustrated in the accompanying drawings.

PRINCIPLES OF THE INVENTION

Figure 1A:
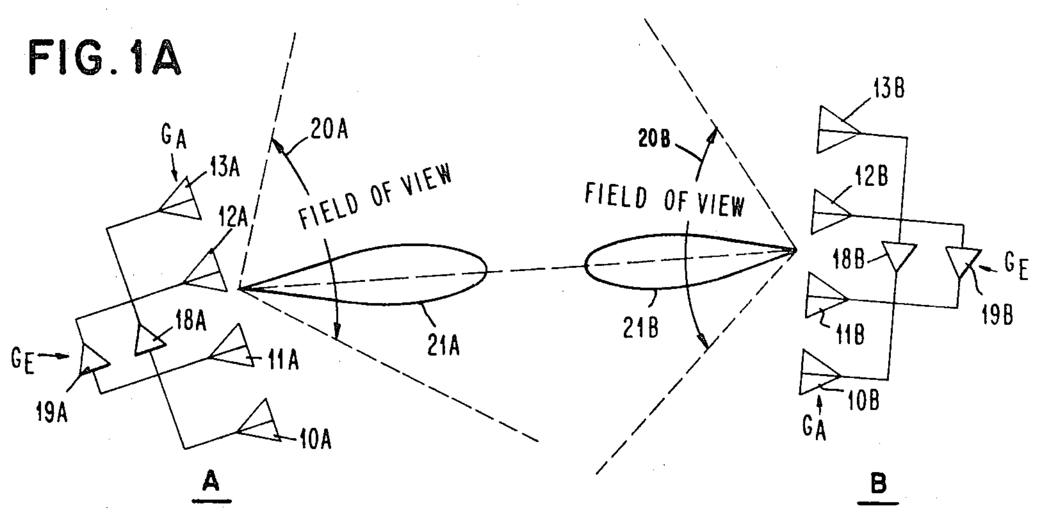
FIG. 1A is a schematic drawing illustrating the principle of this invention that a retrodirective oscillating loop can be initiated from noise spectrum and sustained between two retrodirective antenna array terminals provided each terminal is within the field of view of the other and the gain exceeds the loss in the system.
Figure 1B:
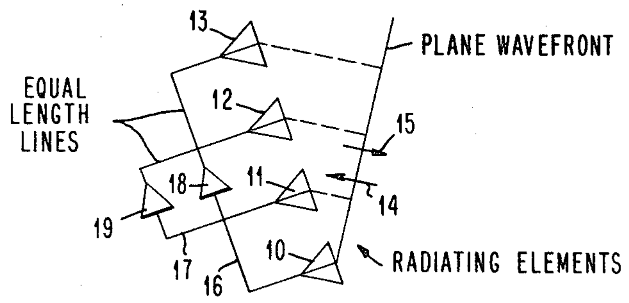
FIG. 1B is a schematic drawing illustrating the nature of a retrodirective antenna array terminal for the practice of this invention.
Figure 2:
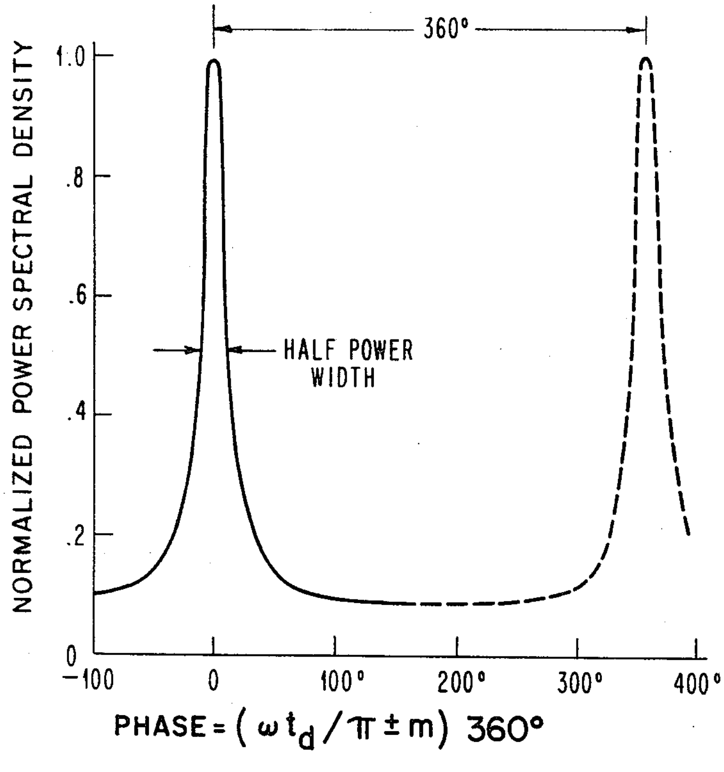
FIG. 2 is a line drawing presenting the theoretical normalized power spectral density for gain greater than one of a retrodirective oscillating loop of one mode during linear portion of the build-up from noise.

A discussion of the principles of this invention will now be initiated with reference to FIGS. 1 to 3. FIG. 1A is a schematic diagram of a retrodirective oscillating loop with retrodirective antenna array terminals A and B; and FIG. 1B presents the nature of the retrodirective property of a retrodirective antenna array. A terminal suitable for the practice of this invention is illustrated in FIG. 1B which is a one dimensional array of antenna radiating elements 10 through 13 of which 10 and 11 receive an incoming plane wavefront 14, and radiating elements 12 and 13 present outgoing identical plane wavefront 15. Pairs of radiating elements 10 and 13 and 11 and 12 are connected by transmission lines 16 and 17 of equal length. Each transmission line 16 and 17 has a respective amplifier 18 and 19 with gain $G_e$. The relative phases of the radiated signals are precisely those required to form a plane wavefront 15 propagating in a direction opposite to the direction 14 from which the received signal originated.

The field of view or spatial angular aperture over which the array can effectively receive or transmit signals is governed by the array geometry and the design of the individual radiating elements 10 through 13. The fields of view 20A and 20B of terminals A and B, respectively, are the angular apertures within which each terminal is sensitive to a radiation input signal and within which it can present an output radiation signal. Prior to the time that a retrodirective oscillating loop is initiated and stably sustained in a communication and control channel comprising terminals A and B and the intervening medium, the fields of view are inclusive of a noise spectrum. It has been discovered for the practice of this invention that remotely located retrodirective antenna array terminals A and B can initiate and stably sustain a retrodirective oscillating loop including terminals A and B from the noise spectrum intercepted from the field of view of the other terminal. During the build-up phase of the retrodirective oscillating loop, polar plot beams 21A and 21B are formed at terminals A and B, respectively.

FIG. 2 is a theoretically derived graph of the normalized spectral density of one mode for gain greater than one. The abscissa is phase which is the product of radial frequency $\omega = 2\pi f$ and the one-way delay time $t_d$. The spectrum of frequencies of the carrier waveform is not a set of discrete lines, since the waveform is not repetitive at the round trip frequency because of the continuous injection of uncorrelated noise and the increasing amplitude. It is a set of bands centered around the positions of the harmonics of the round trip frequency. The width of the bands increases with gain because of the steeper amplitude increase. Because of the shorter history of the waveform and the stronger influence of the injected noise, the bands are also wider at the beginning of the build-up.

During the transitional phase of power-limiting, all discrete lines or modes but one disappear as a result of a mechanism dependent on the control technique. Since the retrodirective loop gain shows one outstanding maximum, the mode near this maximum increases more rapidly than others. With an automatic gain control circuit, the gain is reduced to a level at which it is sufficient to sustain only the strongest mode; and the other modes decay. With an amplitude limiter circuit, the mode spectrum is similar to band limited repetitive noise or to an amplitude and frequency modulated carrier in the center of the band. The limiter circuit removes the amplitude modulation, and new frequencies are generated which extend beyond the band of the build-up mode system. These frequencies are required for a description of the frequency modulated carrier. Amplitude modulation again appears as these frequencies decay. Only a single mode survives, although the interplay of amplitude and band limiting continues.

The basic requirements for establishing a retrodirective oscillating loop are that the two terminals A and B each be within the field of view 20A and 20B, respectively, of each other and that the net gain around the loop is greater than or equal to unity which occurs whenever the distance between the two terminals is less than or equal to the distance given by $$R = (\lambda/4\pi)\, G_a \sqrt{G_e}$$

where $R$ = the distance between two terminals $\lambda$ = wavelength of the radiation $G_e$ = electronic gain at each terminal of each pair of radiating elements $G_a$ = antenna gain at each terminal including the array factor.

The net gain around the loop is the product of the system gain times the system loss $G\,L \geq 1$ which must be greater than or equal to unity. The system gain is $G = G^2_{a1}\, G^2_{a2}\, G_{e1}\, G_{e2}$ where $G_{a1}$ and $G_{a2}$ are the receiver or transmitter antenna array gains of the two terminals, and $G_{e1}$ and $G_{e2}$ are the electronic gains of the two terminals. $L$ = system loss which includes the losses at the terminals and in the intervening medium. For this relationship, the receiver and transmitter gains are assumed to be equal.

Figure 3A:
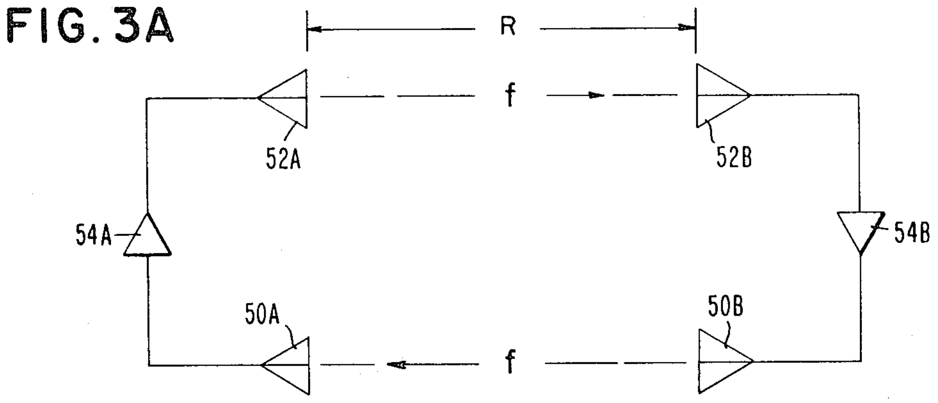
FIG. 3A is a schematic drawing illustrating a monofrequency retrodirective oscillating loop useful for explaining the theory of operation of the invention.
Figure 3B:
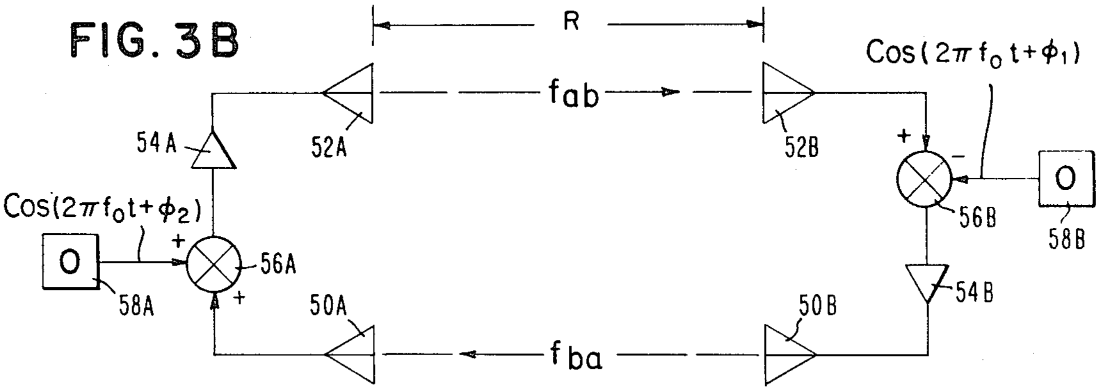
FIG. 3B is a schematic drawing illustrating a retrodirective oscillating loop to achieve frequency offsetting for isolating reception from transmission at the same terminal.
Figure 3C:
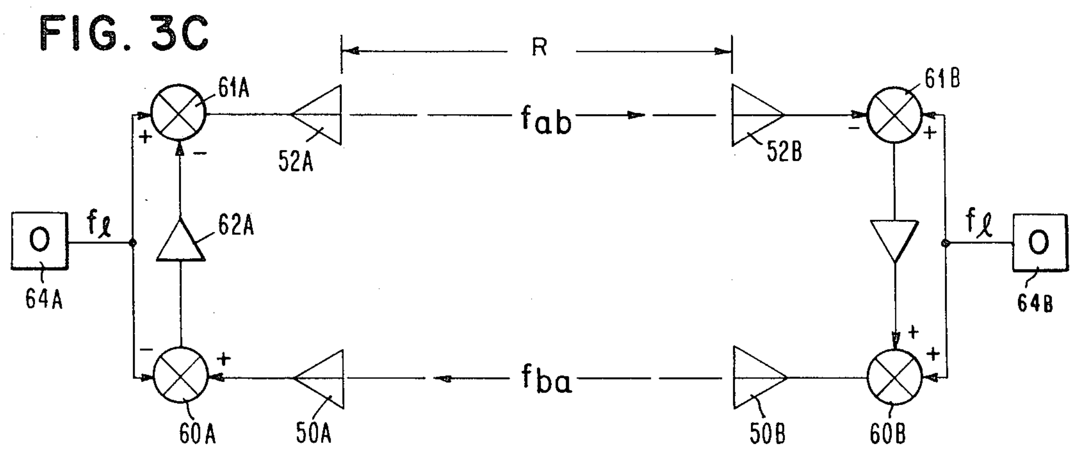
FIG. 3C is a schematic drawing illustrating a retrodirective oscillating loop in which the carrier frequency is converted at each terminal to an intermediate frequency to achieve electronic gain and frequency filtering.

FIGS. 3A to 3C are schematic diagrams illustrating retrodirective oscillating loops for the practice of this invention illustrating the use of local oscillators at the terminals. For clarity of description, the number of antenna array elements presented for each terminal is limited to the number necessary to present the principle under discussion. It will be understood that in an actual embodiment of this invention that it is usually desirable to have several similar antenna array elements at each terminal together with the requisite associated circuitry. The particular operational requirements for the practice of the invention with an embodiment thereof determine the number of antenna array elements and their spatial distribution at each terminal.

FIG. 3A presents a mono-frequency retrodirective oscillating loop useful for describing the operation of an embodiment of this invention and for postulating a theory therefor.

The mono-frequency $f$ of the carrier for transmission or reception of the carrier is established between the terminals according to the build-up from the noise spectrum in the fields of view of the terminals as described with reference to FIG. 1A. Terminal A comprises receiving antenna element 50A and transmitting antenna element 52A connected via amplifier 54A. Carrier frequency $f$ transmitted from antenna element 52A propagates the distance $d$ or R to receiving element 52B of terminal B and is transferred therefrom via amplifier unit 54B to transmitting antenna element 50B for the return path of the retrodirective oscillating loop to receiving antenna element 50A of terminal A. The carrier frequency $f$ proceeds around the retrodirective oscillating loop without frequency conversion at any point, and it should be equal to a harmonic of the round trip frequency $f = 1/t_d$, where $t_d$ is the look transmission time. Each harmonic constitutes a mode for the operation of the retrodirective oscillating loop. A constraint upon the mono-frequency carrier is that its frequency coincides with that of a mode of the operation of the loop.

It was assumed for the description of the operation of the retrodirective oscillating loop presented in FIG. 3A that frequency conversion did not take place at either terminal and that the terminals were stationary in space with respect to each other. Two different frequencies $f_{ab}$ and $f_{ba}$ are utilized in the dual frequency retrodirective oscillating loop presented in FIG. 3B. In addition to the circuit components set forth with respect to FIG. 3A, there are additionally present in FIG. 3B a mixer 56A in the serial path between the input antenna array element 50A and the output antenna array element 52A; and there is connected as an input to the mixer 56A a local oscillator 58A. Local oscillators 58A and 58B introduce frequencies to mixers 56A and 56B having the waveforms $\cos(2\pi f_o t + \phi_2)$ and $\cos(2\pi f_o t + \phi_1)$. For the dual frequency retrodirective oscillating loop of FIG. 3B, it has been determined theoretically to have the physical constraint that the average of the two carrier frequencies $f_{ab}$ and $f_{ba}$ coincide with an operational mode of the loop. Therefore, as concerns frequency and phase constraints, the dual frequency loop of FIG. 3B may be considered to be equivalent to a mono-frequency loop oscillating at the average frequency.

As a result of establishing the frequency offsetting of the type described with reference to FIG. 3B, and proper phase inversion, stabilization against Doppler shifts in frequency due to relative linear motion of the terminals A and B and drift of the local oscillators 58A and 58B can be achieved as described in detail below with reference to FIGS. 8A–8C.

It is desirable to use higher radiofrequencies for the transmission channels of a retrodirective oscillating loop in order to have small antenna array sizes and for wide bandwidth of the two modes of operation set forth in FIG. 3B. Additionally, it is desirable to use intermediate frequencies so that high gain amplifiers and associated electronic equipment of low relative cost can be used.

In order to obtain amplification at intermediate frequency level, the circuitry ofhe terminals A and B is further modified in FIG. 3C to accomplish heterodyning. MXERS ')And 61A are connected to the input and output antenna array elements 50And 52A, respectively, by amplifier and limiter 62A. The local oscillator 64A produces a frequency $f_1$ which is presented to mixers 60A and 61A. The local oscillator frequency $f_1$ is subtracted from the received $f_{ba}$ introduced to antenna array element 50A to provide an intermediate frequency which is amplified in amplifier and limiter unit 62A, and this difference frequency is subtracted from the local oscillator frequency $f_1$ at mixer 61A to produce the output frequency carrier $f_{ab}$ at output antenna element 52A. Accordingly, the carrier frequencies $F_{ab}$ and $f_{ba}$ are offset by twice the intermediate frequency.

If terminals A and B are relatively stationary, the two local oscillators 64A and 64B should be synchronized so that the phase which is added twice to the received carrier at terminal B can be subtracted twice at full amount at terminal A. Even with highly stable oscillators 64A and 64B, a phase difference of many cycles may rapidly develop. The addition or removal of one cycle means an upward or downward shift, respectively, of the mode frequency by one round trip frequency. This involves a shift in frequency to the upper or lower edge of the amplifier 62A pass band where the required loop gain is lost, and the oscillation will decay. As the old mode decays, the loop gain in the center of the amplifier pass band will increase; and the nearest mode will build up to the limiting level. This will also shift the frequency toward the edge of the pass band and decay so that a repetitive mode switching may result. If repetitive mode switching occurs, a stable mode can be achieved by control circuitry, e.g., voltage control of one of the local oscillators 64A or 64B.

FEATURES OF THE INVENTION

The practice of this invention will now be exemplified by a description of several features thereof whereby preferred embodiments will be presented with reference to selected uses of the invention.

PRIVATE COMMUNICATION SYSTEM

Figure 4B:
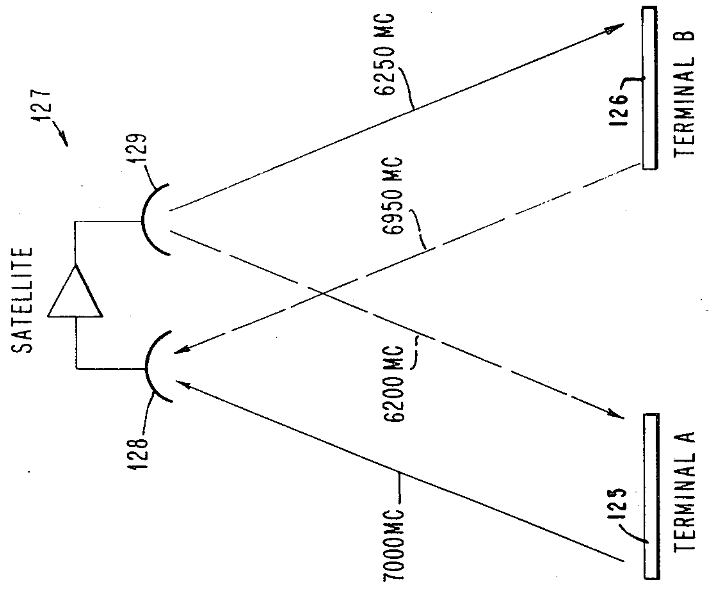
FIG. 4B is a schematic diagram of a retrodirective oscillating loop established between two retrodirective terminals via a satellite.
Figure 4A:
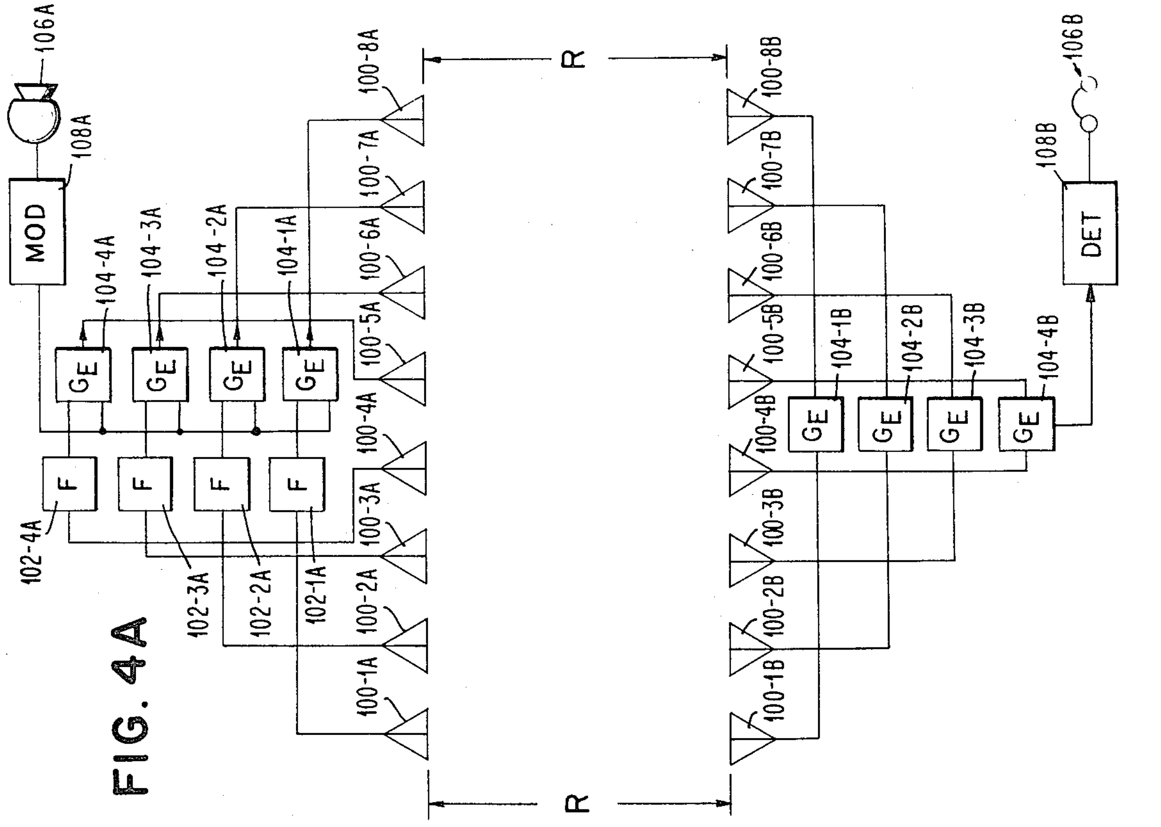
FIG. 4A is a schematic diagram illustrating a retrodirective oscillating loop useful for a private communication system.

The practice of a feature of this invention provides a private radiofrequency communication system shown schematically in two versions in FIGS. 4A and 4B. This communication system is termed private because of the narrow energy beam achieved. The retrodirective oscillating loop of FIGS. 4A and 4B comprise a retrodirective terminal A and a retrodirective terminal B each within the field of view of the other. Electromagnetic energy is transmitted between the arrays in a narrow spatial region, and sufficient amplification gain is present at each terminal to provide an oscillation because of feedback. The oscillation is that of a carrier frequency which provides an integral number of wavelengths in a round trip transit distance. The retrodirective oscillating system of FIGS. 4A and 4B makes communication possible between terminals A and B thereof even though they may differ widely on relative bearing to each other, and their spatial orientations are not controlled. For the retrodirective oscillating loops illustrated in FIGS. 4A and 4B, the carrier frequency will vary as a function of the range betweeen terminals A and B because the loop phase shift varies with range.

Terminal A has antenna array elements 100-1A to 100-8A with pairs 100-1A and 100-8A, 100-2A and 100-7A, 100-3A and 100-6A, and 100-4A and 100-5A comprising receiving and transmitting elements, respectively. The same length of serial transmission paths of filters 102-1A to 102-4A and bilateral or unilateral amplifiers 104-1A to 104-4A are connected between the respective pairs of receiving and transmitting elements. If bilateral amplifiers are used, the full retrodirective antenna array gain is available. If unilateral amplifiers are used with this system, only half the antenna gain is effective. However, much higher unilateral gain can be achieved in practice. The filters 102-1A to 102-4A prevent undesired oscillations from occurring in the retrodirective oscillating loop. Modulation and detection can be achieved at either terminal A or terminal B. Illustratively, a source of modulating energy 106A, e.g., sound, is connected to modulator 108A for modulating the carrier frequency established in the retrodirective oscillating loop.

The circuitry of terminal B is identical to the circuitry at terminal A except that the filters are omitted, and there is provision for detection rather than modulation. The detection is accomplished by detector 108B which sends detected energy to a receiver therefor, e.g., earphones 106B.

FIG. 4B is a schematic diagram of a retrodirective oscillating loop which is established between two retrodirective antenna array terminals via another communicating member. The figure shows two retrodirective terminals A and B, presented as blocks 125 and 126, respectively, which represent retrodirective oscillating loop terminals. The satellite 127 is a simple amplifying and frequency translating repeater. The antennas 128 and 129 in this satellite are for reception and transmission over fixed fields of view. The beams of these antennas can be directional or omnidirectional. The only restriction in a system such as this is that these satellite antennas must contain both terminals A and B is their beam width. Illustratively, the up direction of terminal A is at a frequency 7,000 megacycles; and the return to terminal B is 6,250 megacycles. Terminal B transmits back at 6950 megacycles to the satellite, and the satellite transmits downward at 6,200 megacycles to terminal A. The terminals A and B are equipped to transmit and receive at the particular frequencies and oscillate in a retrodirective oscillating loop when the gains in the terminals and the satellite overcome the losses in the intervening medium between terminals A and B and the satellite.

The system of FIG. 4B is an example of a general principle that a retrodirective oscillating loop provided by this invention can be established by an indirect path as well as a direct path.

MODULATION

Figure 5A:
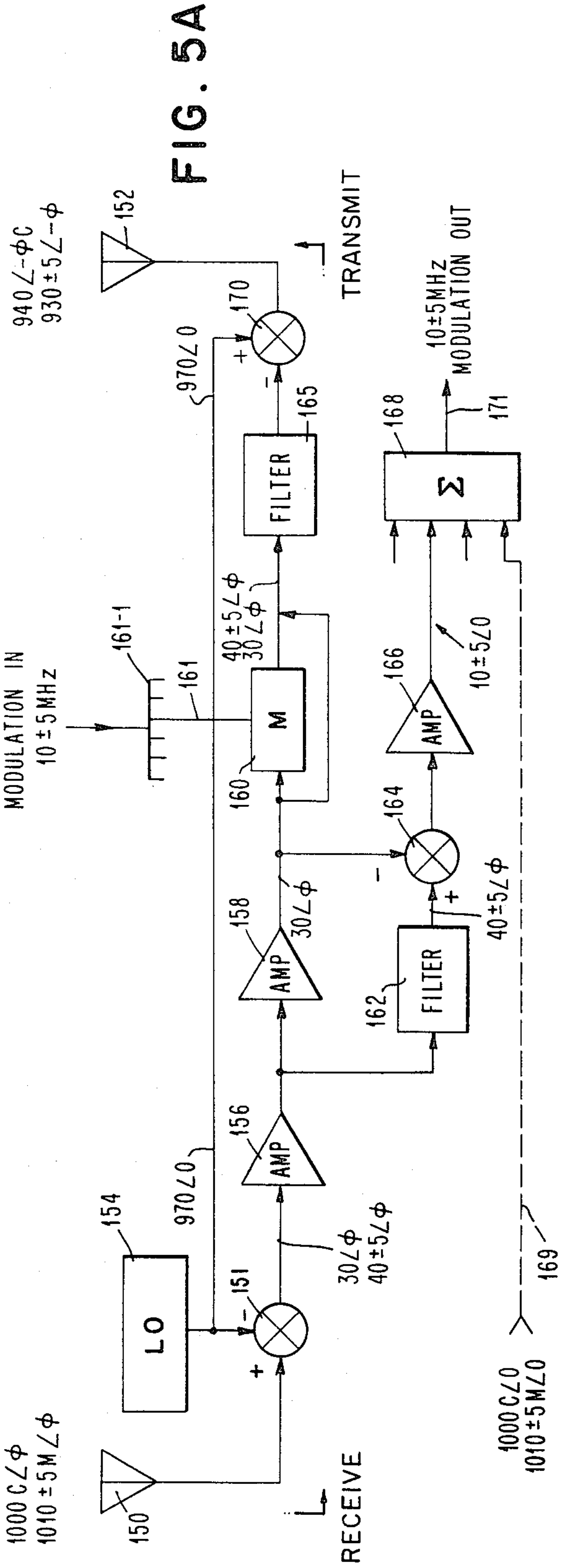
FIG. 5A is a line drawing illustrating a technique for achieving modulation of a carrier frequency in a retrodirective oscillating loop.
Figure 5B:
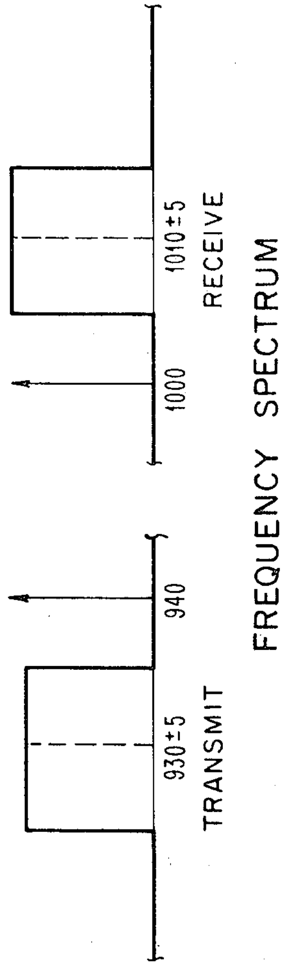
FIG. 5B is a line drawing illustrating the frequency spectrum for the particular frequencies of FIG. 5A.

A modulation technique will now be described with reference to FIGS. 5A and 5B wherein FIG. 5A presents schematic circuitry for achieving full antenna array gain for modulation of the carrier frequency, and FIG. 5B is a line drawing illustrating the transmit-receive frequency spectrum. An illustrative operation for a specific design will be presented for descriptive purpose. As the initial condition it is assumed that the retrodirective oscillating loop, of which the circuitry of FIG. 5A is at one terminal, has the carrier frequency of 1,000 megacycles or megahertz established in the loop and that the received modulation is contained in a 10 mc band centered about 1,010 mc. The phase $\phi$ of the carrier frequency and the modulation thereof with respect to the phase at an antenna element of the array are approximately equal. This phase differential $\phi = 2\pi/\lambda\ d_a \sin \Theta$, where $\lambda$ = wavelength, $d_a$ = distance between the respective array elements of the terminal, $\theta$ = angle of offset from broadside.

The received carrier frequency at input antenna element 150 is beat down to 30 mc in mixer 152 by the local oscillator 154 frequency 970 mc, and the modulation is beat down in mixer 151 to 40 ± 5 mc with preservation of the phase. Both the intermediate frequency and the modulation are amplified in preamplifier 156. A high-gain, narrow-band amplifier 158 amplifies the 30 mc intermediate frequency; and the 40 ± 5 mc modulation frequency is passed through the band pass filter 162. The 40 ± 5 mc modulation frequency is then beat against the strong 30 mc intermediate frequency in mixer 164 with the difference frequency being selected and amplified in amplifier 166. The resultant phase of the 10 ± 5 mc modulation frequency is zero which is the same phase as at every other antenna array element of the terminal of FIG. 5A. The outputs from every other antenna array element are in phase and are combined in summing amplifier 168 to provide the modulation frequency output to the modem, not shown, on line 171. For an antenna array of N elements, there is a net increase of the signal-to-noise ratio equal to N by taking advantage of the full antenna array gain. The input modulation from the modem is established on line 161 at 10 ± 5 mc single side band to modulate the 30 mc intermediate frequency in modulator 160 to provide 30 mc and 40 ± 5 mc output frequencies to filter 165, each with phase angle $\phi$. Line 161 is connected to the modulation input via connector 161-1 which is shown as having a plurality of contacts for connecting the input modulation to the other circuits for the other pairs of antenna elements of the array. When the latter signals are beat against the 970 mc signal from the local oscillator 154 in mixer 170, with the difference frequency being selected, phase inversion results with outputs 940, angle - $\phi$ mc and 930 ± 5, angle $-\phi$ for the carrier and modulation frequencies, respectively.

The frequency spectrum identified for the operation of this modulation circuitry of FIG. 5A is summarized in the transmit-receive frequency spectrum line drawing illustrated in FIG. 5B.

The modulation technique described with reference to FIGS. 5A and 5B is essentially a single side-band modulation technique. The narrow-band retrodirective oscillating loop carrier frequency is separated from the modulation band frequency by filtering. With the frequency spectrum separation illustrated, the type of modulation for the subcarrier is not restricted; and any type of modem can be used in conjunction with the modulation circuitry of FIG. 5A provided it does not cause spectral spread of the modulation into the narrow-band carrier region.

Amplitude modulation and also some forms of frequency modulation and phase modulation are also possible forms of modulation of the carrier. in the latter two cases certain modulation indices suppress the carrier and are therefore inadmissible.

ISOLATION OF RECEPTION AND TRANSMISSION

Figure 6:
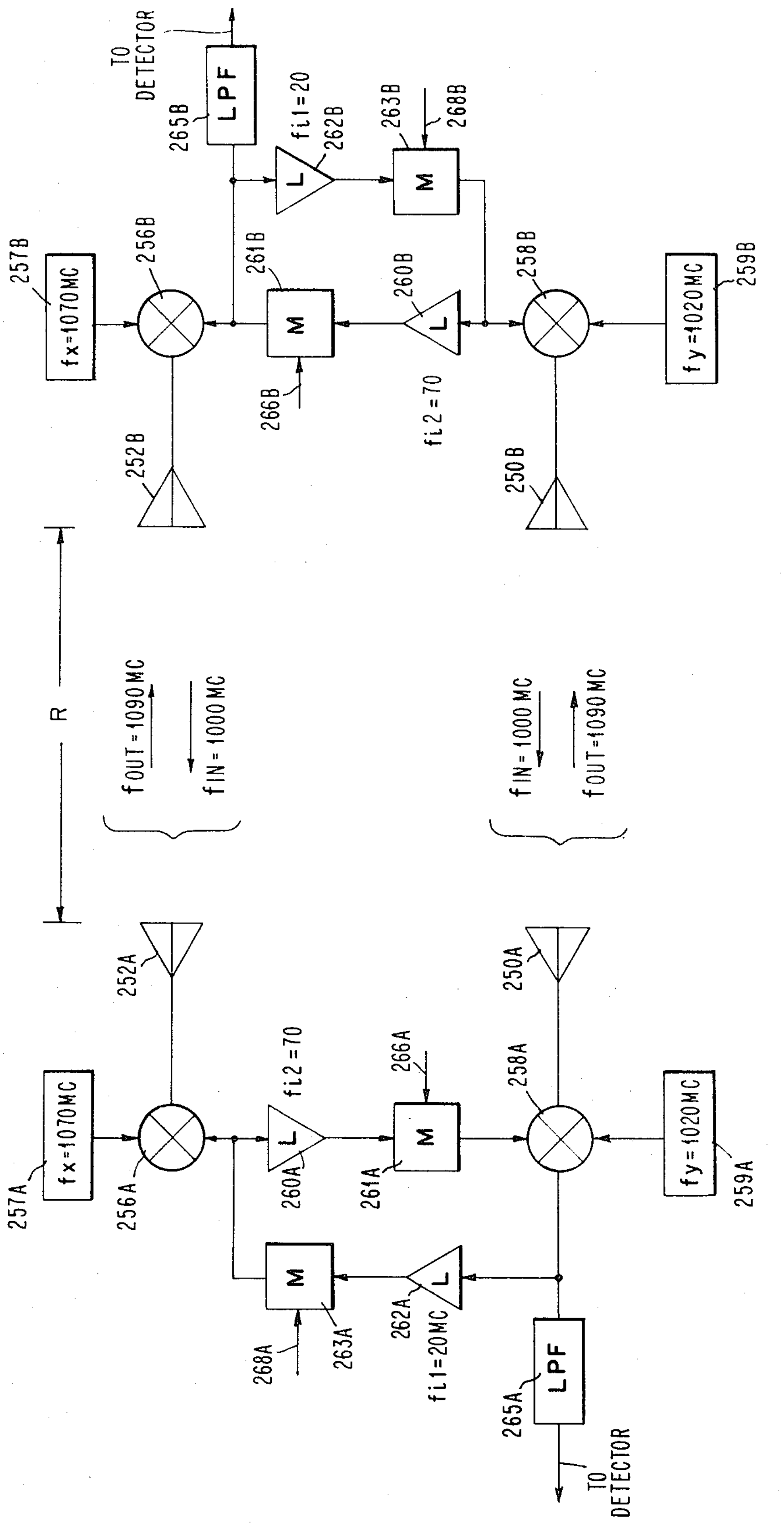
FIG. 6 is a schematic drawing ilustrating an embodiment of the invention for frequency offsetting whereby the same antenna element is used for both receive and transmit of carrier frequencies.
Figure 7:
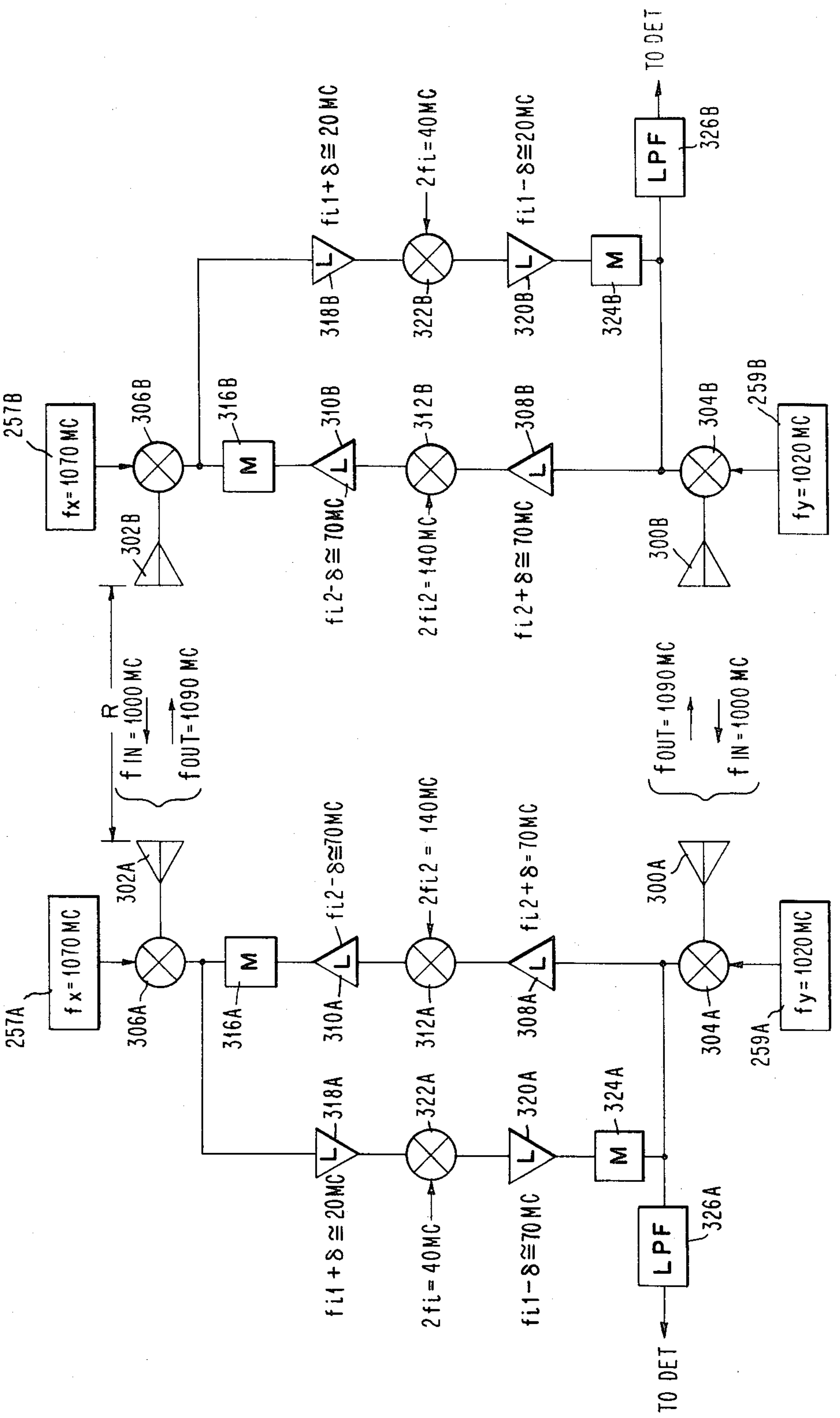
FIG. 7 is a schematic drawing of another embodiment of the invention for frequency offsetting whereby the same antenna element is used for both receive and transmit of carrier frequencies.

Embodiments for the practice of another feature of this invention are illustrated in FIGS. 6 through 8 for isolation of reception and transmission of electromagnetic energy at each retrodirective antenna array terminal of a retrodirective oscillating loop through the use of intermediate frequencies. The practice of the feature utilizes frequency offset at intermediate frequencies at which filtering of frequencies is much more effective for the same numerical offset. This permits each antenna element to be used for both reception and transmission. By using one antenna simultaneously for receive and transmit, the effectiveness of antenna area is doubled when unilateral amplifiers are used instead of bilateral amplifiers. Two local oscillators at each array provide intermediate frequencies $f_{i1}$ and $f_{i2}$. Further, circuitry is also provided at each retrodirective array for phase inversion of the intermediate frequency which compensates for the Doppler shift due to relative motion between the retrodirective antenna array terminals and the drift in frequency of local oscillators of the retrodirective oscillating loop in which unilateral amplifiers are used to achieve full antenna gain with retrodirective arrays.

FIG. 6 illustrates schematically two complementary retrodirective antenna array terminals for the practice of this feature of the invention. A pair of antenna elements 250 and 252 are present at each retrodirective antenna array terminal. Several pairs of antenna elements are usually used in an actual terminal. Each antenna element performs the functions of both a receive antenna and a transmit antenna.

The input frequency received at both antenna elements 250A and 252A of the terminal A is 1,000 megacycles, and the transmitted frequency therefrom is 1,090 megacycles. The 1,000 mc signal at antenna element 252A subtracts from the local oscillator signal $f_x$ = 1,070 mc in mixer 256A leaving a 70 mc intermediate frequency which can only pass through the 70 mc IF amplifier and be amplified. It mixes with the 1,020 mc intermediate frequency signal introduced at mixer 258A and the sum thereof forms a 1,090 mc carrier frequency which is the output at antenna element 250A. The 1,000 mc carrier frequency signal received at the local antenna element 250A mixes with the local oscillator frequency 1,020 mc introduced to mixer 258A and forms a 20 mc intermediate frequency which can only pass through the 20 mc IF amplifier 262A and mix with the local oscillator 257A frequency introduced to mixer 256A to form the 1,090 mc carrier frequency output on antenna element 252A. A circulatory oscillation in the path including both amplifiers 260A and 263A is prevented by the filtering provided by frequency separation between the IF channels.

Modulation may be conveniently provided at modulator 261A or 263A on lines 266A or 268A, respectively. Alternatively, the local oscillators 257A or 259A may be modulated. Greater depth of modulation is obtained at intermediate frequency, but additional modulators are required therefor. Detection is optimally accomplished at relatively low IF signals and is protected by low pass filtering 265A from the modulation.

The complementary terminal B receives the 1,090 mc carrier frequency and transmits the 1,000 mc carrier frequency as shown. In contrast to the addition of frequencies at terminal A, each of the local oscillators subtract a frequency from the incoming carrier frequency to form an intermediate frequency and the detection of amplification thereof is reversed.

The frequency relationships of FIG. 6 are generalized as follows for terminal A:

$$a.\ f\,out = fx - f\,in + fy + fi2 = fy \quad (1)$$

$$b.\ f\,out = fy - fin + fx = fi1 + fx$$

$$a.\ fy = fin + fi1 \quad (2)$$

$$b.\ fx = fin + fi2$$

$$a.\ f\,out = fi2 + fi1 + fin \quad (3)$$

$$b.\ f\,out = fi1 + fi2 + fin$$

$$f\,offset = fi2 + fi1 = fi1 + fi2 \quad (4)$$

In equations 1 through 3 the (a) expression is for entering at the upper antenna and the (b) expression is for the lower antenna. Equation 3 shows that the output frequency is the same in either case, and equation 4 shows that the offset is the same. Similar generalized frequency relationships are obtained for complementary terminal B as follows:

$$a.\ f\,out = -(fin - fx) + fy = -fi1 + fy \quad (5)$$

$$b.\ f\,out = -(fin - fy) + fx = -fi2 + -fx$$

$$a.\ fy = fin - fi2 \quad (6)$$

$$b.\ fx = fin - fi1$$

$$a.\ f\,out = fin - (fi1 + fi2) \quad (7)$$

$$b.\ f\,out = fin - (fi2 + fi1)$$

$$f\,offset = fin - f\,out = fi1 + fi2 \quad (8)$$

The same offset frequency is obtained regardless of the antenna element for entry of the signal, and it is equal to the sum of the IF frequencies. The same local oscillator frequencies are used so that terminal B is complementary to station A. The intermediate frequencies may be chosen to provide adequate isolation between the carrier frequencies of the retrodirective oscillating loop.

The circuitry of FIG. 7 compensates for oscillator drifts and Doppler shift and thereby provides for more stable operation of a retrodirective oscillating loops. Although the circuit of FIG. 7 need only be used for terminal A, it is also illustrated for complementary terminal B for clarity. It provides a stable frequency shifted only by a Doppler frequency corresponding to the offset frequency and at one-half the drift frequency error of any local oscillator. In comparison with terminal A of FIG. 6, an additional local oscillator is incorporated in each IF channel of terminal A of FIG. 7 which oscillates at twice the intermediate frequency of the channel. The double frequencies $2fi1$ and $2fi2$ are mixed with the corresponding IF signals of the respective intermediate channel to provide the resulting frequencies $fi1$ and $fi2$. If $fi + \delta$ is the input to the mixer 312A or 322A, the output is $2fi - (fi + \delta) = fi - \delta$. Since there is reversal of sign of a small frequency difference $\delta$ for both frequency difference and phase shift, there results nearly complete cancelation of the Doppler and frequency changes.

Figure 8A:
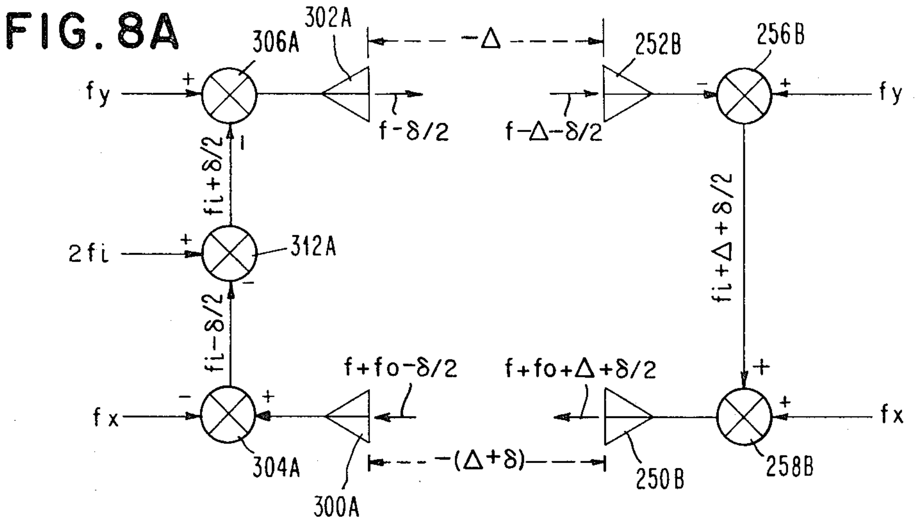
FIGS. 8A to 8C are schematic drawings useful for explaining the operation of embodiments which uses at one terminal circuits of the type shown in FIG. 6 and at the other terminal circuits of the type shown in FIG. 7, and in which stabilization of frequency is illustrated.
Figure 8B:
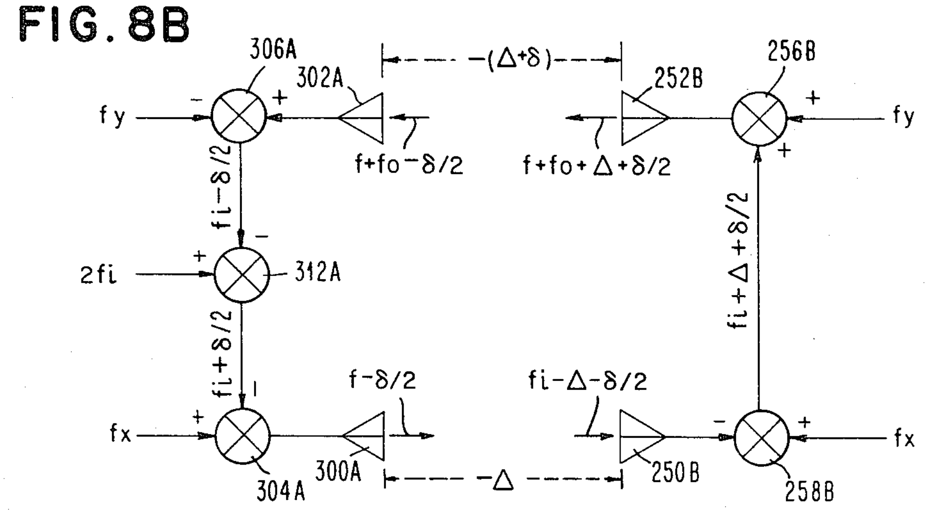
Figure 8C:
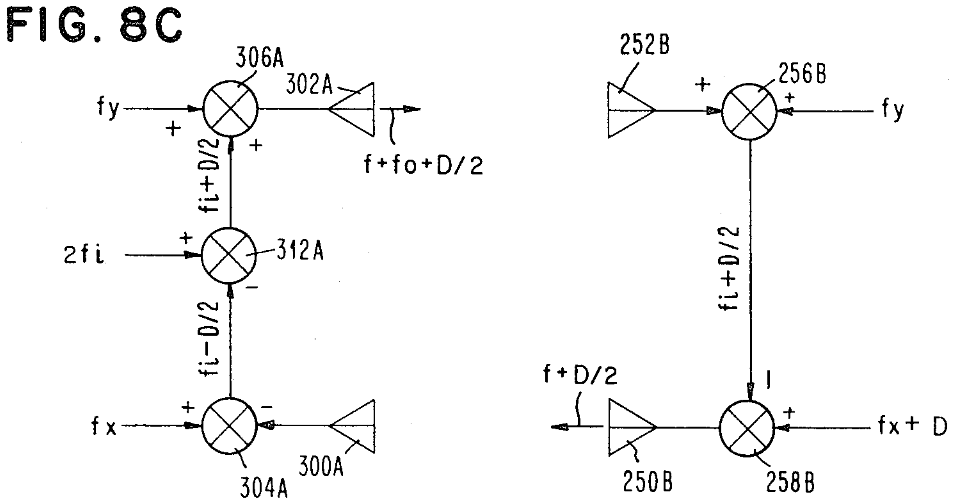

The schematic circuit diagrams of FIGS. 8A to 8C will now be referred to for explaining in greater detail the compensation of Doppler shifts and oscillation frequency changes in the operation of the retrodirective oscillating loops of FIGS. 6 and 7. In these figures the A terminal includes the circuit of the type shown in FIG. 7 and the B terminal includes the circuit of the type shown in FIG. 6. In FIG. 8A, the frequency is f in the right direction and is $f + fo$ in the left direction. The Doppler shift between stations A and B is $\Delta$ for the right direction and $\Delta + \delta$ for the left direction which is higher in frequency. The signals shown comprise a stable oscillating frequency as is evident by tracing the signals around the loop.

Mixer 304A converts the frequency $f + fo$ to IF $fi1$. Because $f + fo$ is greater than $fx$, $fi = (f + fo) - fx$ and $[(f + fo) - (\delta/2)] - fx = fi - (\delta/2)$ where $-\delta/2$ is a negative error in the frequency transmitted in the left direction. At mixer 306A the IF is subtracted from $fy$. At mixer 256B the $f$-$\Delta$-$\delta/2$ frequency is subtracted from $fy$. Because the If adds to the local oscillator at mixer 258B, no additional sign inversion takes place. Since the same motion is taking place which caused minus Doppler shift, $\Delta$ in the right direction frequency, minus Doppler shift $\Delta + \delta$ occurs in the left direction frequency $f + fo$. Therefore, the frequency error is $-\delta/2$ because of the motion between the stations, where $\delta/2$ is half the one-way Doppler shift corresponding to the offset frequency.

FIG. 8B illustrates that the operation is the same for the other IF channel.

FIG. 8C illustrates that a frequency drift D of a local oscillator causes the loop carrier frequency to shift by D/2. Once the drift D is fixed, the retrodirective oscillating loop carrier frequency remains stable. The loop carrier frequency error is a composite of the local oscillator drifts and the Doppler of the offset frequency.

Build-up of the retrodirective oscillating loop frequency is dependent upon the phase around the loop being multiples of $2\pi$. The round trip tolerance per loop may be taken as $\phi = 1$ radian or $\pi/3$ which is a somewhat arbitrary criterion. Therefore, the tolerance on velocity can be calculated from $\phi = (\delta/2)\ T\ (\pi/3)$ where T is the loop round trip time. $\phi = (2/3)\ \pi\ (1/T) \sim 2/T$ or $T = 2/\delta$.

$\delta$ can be determined from $= \nu/\lambda o = \nu fo/C$ where $\lambda o$ is the wavelength of the offset frequency $fo$, $\nu$ is closing rate, and C is the velocity of light. As $T = 2R/C = (C/\nu fo)$ and $\nu = C^2/foR$. Accordingly, the tolerance on closing rate is strictly a function of offset frequency and range. Intelligence bandwidth and isolation considerations are the ultimate determinants of the offset frequency. Illustratively, a change in closing rate of $10^3$ meters per second is readily accommodated at a range of $10^6$ meters for an offset frequency of $10^8$ megacycles without retuning the intermediate frequency carrier pass band filters.

AIRCRAFT VERTICAL DIRECTION FINDER AND ALTIMETER

Figure 9B:
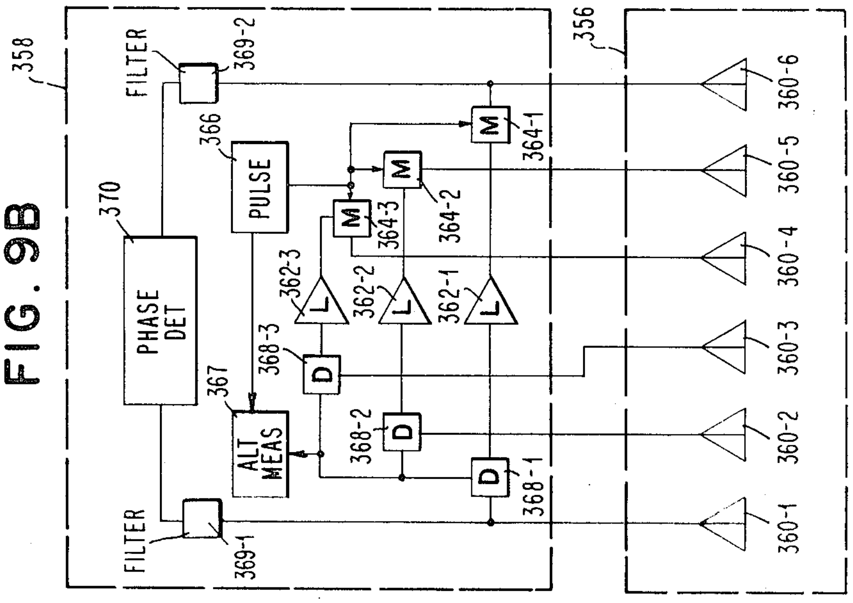
FIG. 9B is a schematic diagram of circuitry for the practice of the technique illustrated in FIG. 9A.
Figure 9A:
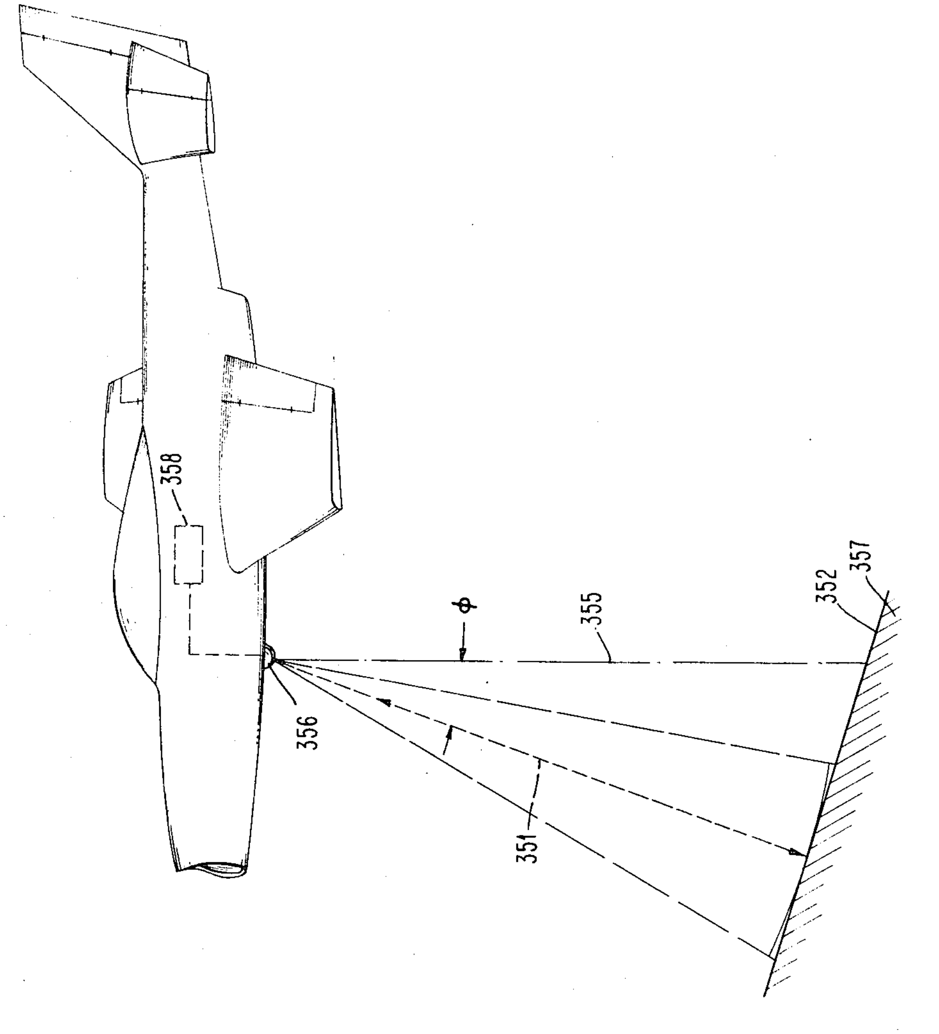
FIG. 9A is a line drawing illustrating the practice of the invention for determining the vertical direction to earth from an aircraft and the distance therefrom.

Another feature of this invention now to be described with references to FIGS. 9A and 9B provides circuitry in a retrodirective oscillating loop for determining the vertical direction 351 from an aircraft 350 to the surface 352 of the earth 354 and for measuring the distance or altitude 355 therefrom. A retrodirective antenna 356 is situated on the undersurface of aircraft 350 and is shown in greater detail in FIG. 9B as is electronic circuitry 358. The altitude 351 of aircraft 350 is at an angle $\phi$ with respect to the vertical 355 from the tangent at the surface of the earth. The antenna elements 360-1 to 360-6 of the retrodirective array are interconnected in pairs 360-1 and 360-6, 360-2 and 360-5, and 360-3 and 360-4 through amplifier and limiter units 362-1 to 360-3, respectively, also characterized by the symbol L. The modulator units 364-1 to 364-3 also characterized by the symbol N modulate the radiofrequency present in the respective paths by pulsing from pulse source 366 or by frequency modulation in a manner not shown. Detector units 368-1 to 368-3 characterized by the symbol D established in the respective antenna pair paths detect any modulation on the radiofrequency carrier receiveed by the antenna array 356. Altitude measuring device 367 measures the time interval between transmission of pulse and receipt of pulse from the reflecting surface and thus indicates distance for altitude of aircraft from nearest earth surface. Phase detector 370 measures a difference in phase between the extreme array elements 360-1 and 360-6 and is optimally connected in the manner shown to be most sensitive to any phase difference in the received waveform. Filters 369-1 and 369-2 are band pass filters which are tuned to the oscillation frequency of the retrodirective oscillating loop so that phase detector 370 measures only the phase difference of that frequency When the gain of each of the limiting amplifiers 362-1 to 362-3 is sufficiently high to overcome the space losses around the retrodirective oscillating loop, a stable oscillation is initiated and sustained. Effectively, the reflected energy from the surface 352 of the earth 354 is retrodirective with regard to antenna array 356. The losses go from antenna output $A_0$ to the earth and retrodirectively from the surface thereof to the input $A_1$ of the antenna array 356. The loop is completed through the limiting amplifiers whose gain in each link is $G_E$. An oscillation builds up at any range from the aircraft 350 to the surface 352 according to the expression $$R=\lambda\sqrt{\frac{G_A G_E \sigma_o}{4\pi}}$$

where $\sigma_o$ is the retrodirectivity specific cross-section of the surface of the earth, λ is the carrier frequency of the oscillation, and $G_A$ is the gain of the antenna array 356 including the retrodirective property of the earth. The action of the limiter units L is such that the oscillation in the retrodirective oscillating loop occurs only in the direction of maximum gain which is influenced by both the retrodirecting cross-section of the surface of the earth $\sigma_o$ and the range R. The range attenuation is related to the range as $R^4$ so the loop oscillation occurs sensitively in the direction in which R is equal to the altitude 351 of the point of closest distance of the surface 352 of the earth 354 with respect to the aircraft 350 at the location of the retrodirective antenna array 356. The maximum value of $\sigma_o$ is usually maximum in the direction R, e.g., over water. Therefore, the retrodirective oscillating loop for the aircraft 350 occurs approximately in the direction of the local vertical 351. The altitude 351 of the aircraft 350 is determined by the phase measurement made by phase detector 370 on the carrier frequency received in the antenna array 356 due to the oscillation in the retrodirective oscillating loop.

The practice of this feature of this invention provides an especially beneficial altitude measurement because greater antenna array gain can be utilized than with a conventional altimeter device which must have sufficiently wide antenna aperture to accommodate a wide variation of aircraft maneuvering. This limits the maximum altitude at which desirable performance can be achieved by altimeter devices of the prior art. This feature of this invention provides a narrow beamwidth, and better range performance and higher altitude performance are achieved than by the prior art practice. Since the antenna array 356 can be a planar array fixed to the aircraft 350, form factors do not cause problems.

The system illustrated with reference to FIG. 9 involves operation with respect to an extended reflecting surface. The principle of operation can be used in situations in which the reflecting surface is smaller in extent than the illuminating beamwidth. In such a case the system of FIG. 9B will measure the distance to the reflector (range) and also the bearing. However, in this case, the gains required for specific range operations are higher than indicated by the formula given above.

EXPERIMENTS FOR THE INVENTION

The experimental results documented in this section demonstrate the validity of the theoretically determined performance of a communication and control system incorporating retrodirective array terminals in accordance with this invention.

An experimental retrodirective oscillating loop for 410 to 480 MHz reception/transmission using four channel arrays will now be described. Separation between antenna array terminals was 750 feet.

Figure 10A:
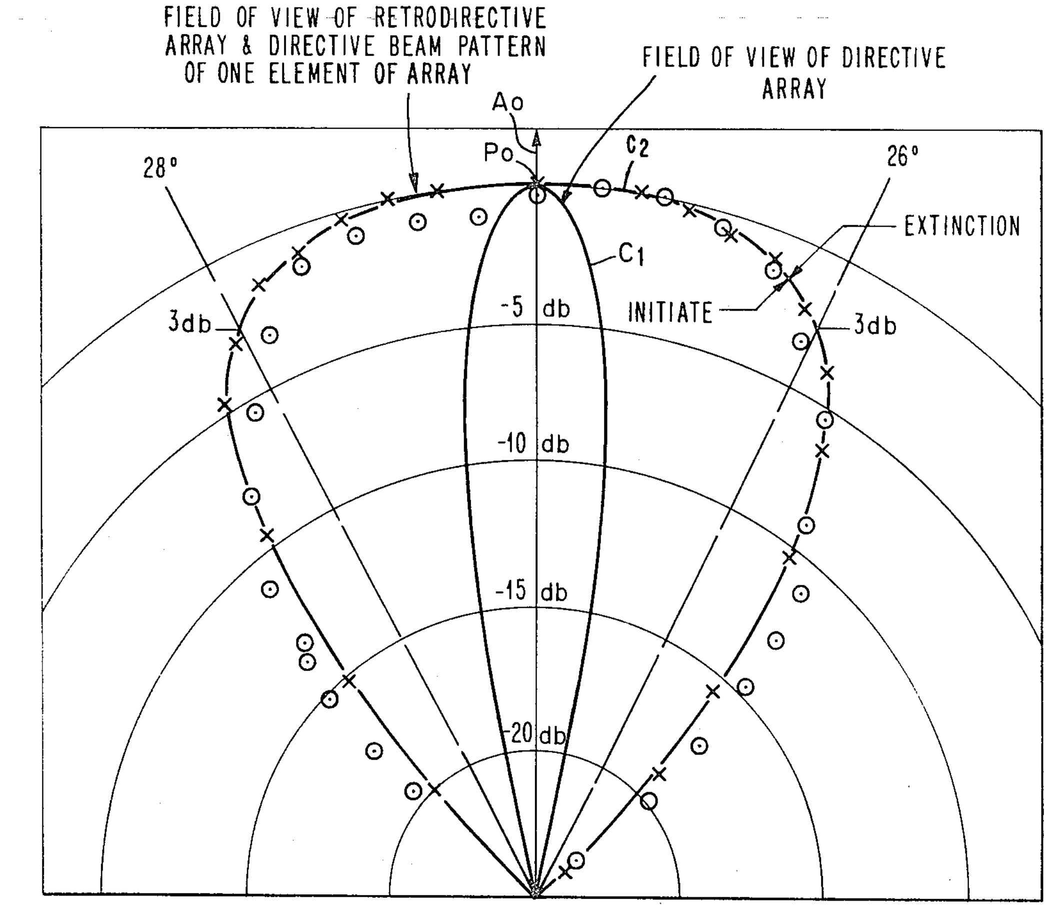
FIG. 10A is a line drawing illustrating experimental data of the oscillation threshold plotted versus antenna array orientation for a retrodirective oscillating loop.

The amplifier gain required to initiate and extinguish an oscillation in the retrodirective oscillating loop is shown in FIG. 10A. The increase in amplifier gain required to initiate oscillation at any angle off broadside is plotted in comparison with the decrease in antenna gain which occurs when the antenna is steered off broadside. The amplifier gain increases from point 0. The antenna data was obtained by forming the product of the element patterns for the 410 MHz and 480 MHz antenna elements. As can be seen from the plot, the decrease in antenna gain as a function of angle is offset by the increase in electronic gain to maintain threshold. The half-power beamwidth of the antenna array is seen to be 54° in the horizontal plane.

Figure 10B:
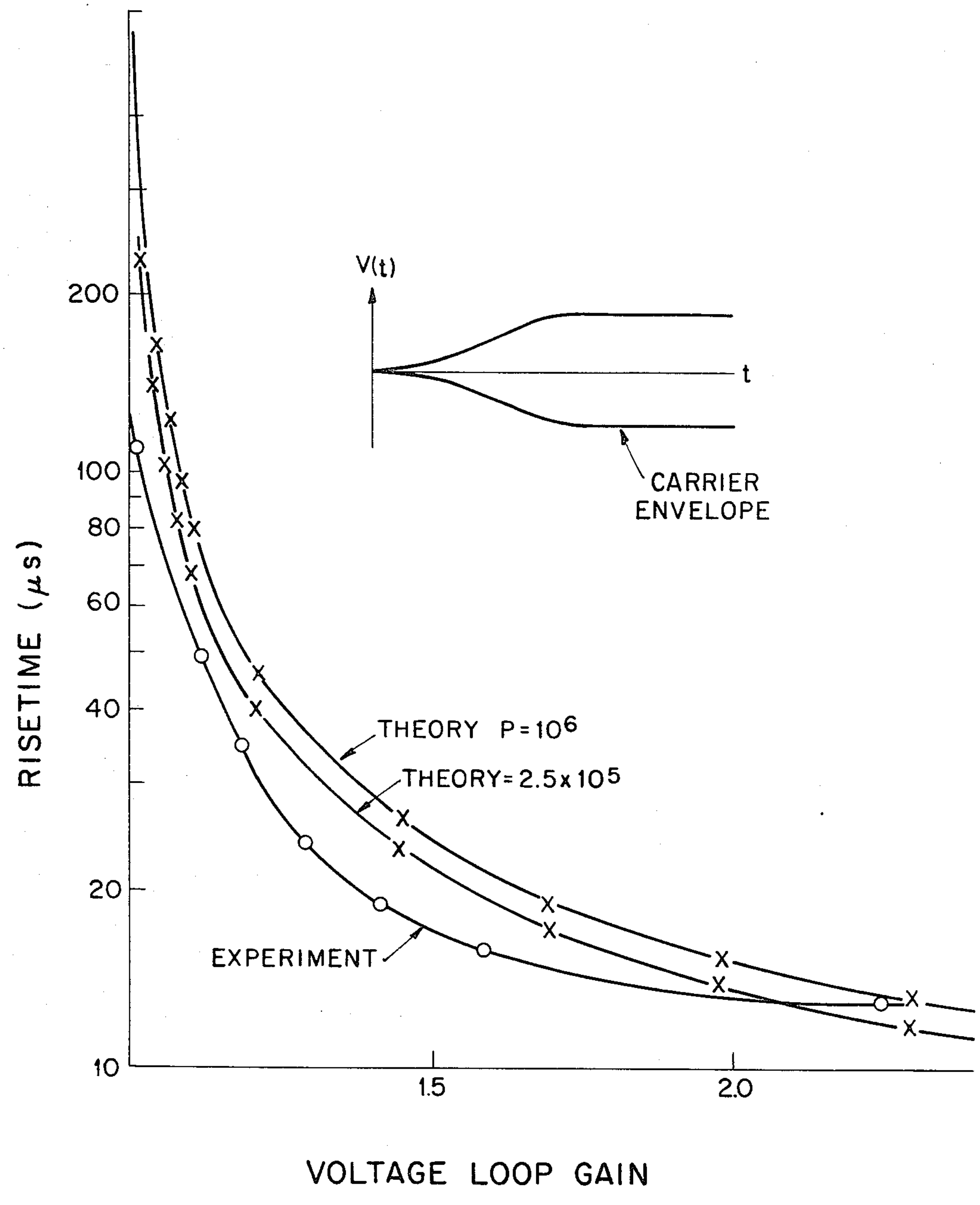
FIG. 10B presents a graph of experimental data showing mode build-up plotted against loop gain for a retrodirective oscillating loop and comparable graphs according to theoretical considerations.

The channel A array was oriented broadside to the channel B array, and the antenna elements were connected not as a retrodirective array but as a reflective array. The channel A array was then rotated from broadside and the antenna gain was observed to be a very sharply decreasing function of angular offset, following the array pattern, which is also shown in FIG. 10B. From this experiment, it is evident that the beam in the system is truly a narrow phased array pattern in the horizontal plane which is steered retrodirectively. The half-power beamwidth of the array pattern was determined to be 10° in the retrodirective (horizontal) plane.

Mode build-up time of the oscillating array was also measured experimentally. The results, compared with the theoretical predictions, are shown in FIG. 10B.

Figure 10C:
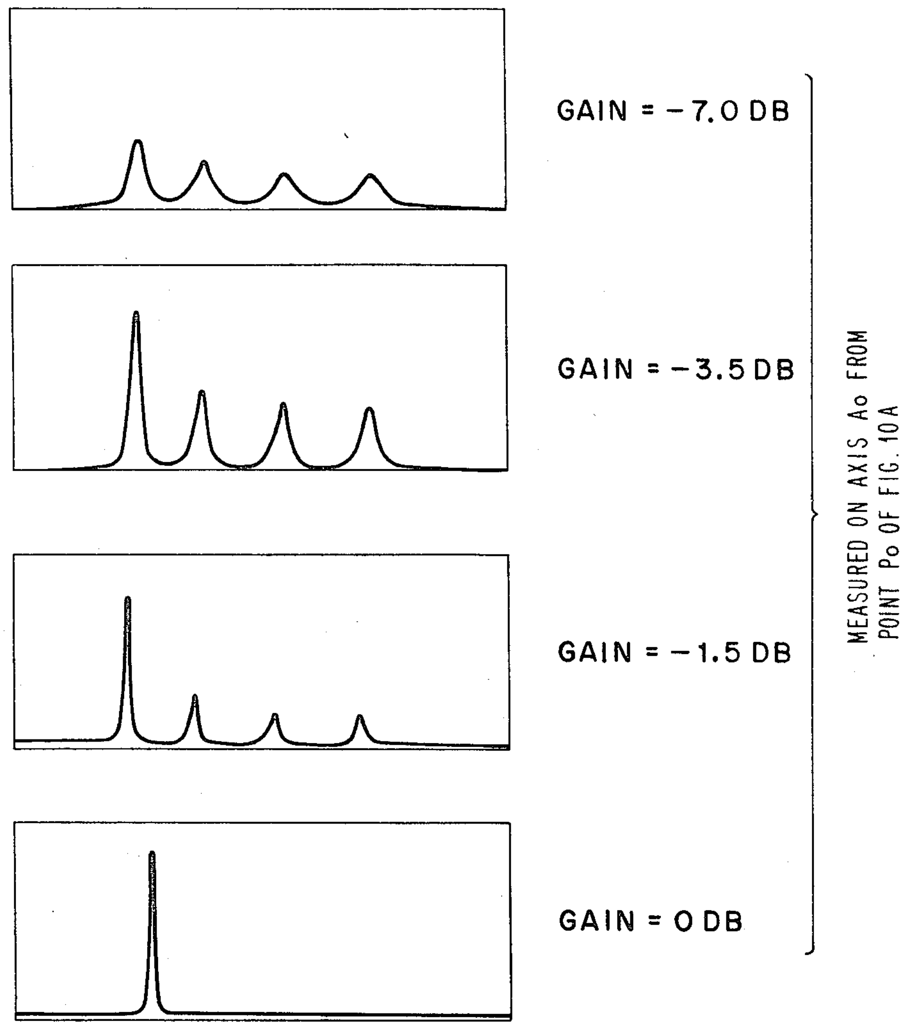
FIG. 10C presents oscilloscope traces of experimental data of the mode spectra at 480 MHz for retrodirective oscillating loop of FIGS. 10A and 10B.

The form of the modes were observed for various values of system loop gain, and the data is presented as the oscilloscope trace in FIG. 10C. The mode structure below threshold exhibits the periodic form predicted in the theoretical analysis. As the loop gain is increased, the process of selection of a single mode is observed (FIG. 10C) until essentially only one retrodirective oscillating loop mode is present as the loop threshold is attained. A carrier-to-noise ratio of greater than 49 db was obtained for a loop gain near threshold.

In greater detail FIG. 10A presents graphs useful in demonstrating that terminals A and B for the experimental setup established a retrodirective oscillating loop. FIG. 10A presents polar diagrams curve C1 which is descriptive of the energy plot for the entire antenna array terminal A connected as a directive antenna array and curve C2 which is descriptive of the polar energy plot of one element of the antenna array employed as a directive antenna element. Curve C2 is also descriptive of the field of view of antenna array terminal A considered as a retrodirective antenna array. The vertical axis $A_0$ is a scale of energies with points of amplifier gains plotted for an oscillation for a varying relative direction between antenna array terminal A and antenna array terminal B by actually rotating the terminal A which is the same effect as if terminal B were moved on a circumferential path. These amplifier gains were plotted on the graph of FIG. 10A and essentially fell in the same locations as the field of view of the retrodirective antenna array. These amplifier gains were made relative to the amplifier gain at the base point $P_0$. Since the same plot of amplifier gain is achieved for increasing the amplifier gain and for decreasing the amplifier gain, it was demonstrated that the antenna gain due to retrodirectivity was controlling the oscillation in the retrodirective oscillating loop.

THEORY OF THE INVENTION

A retrodirective oscillating loop provided by this invention makes use of the basic property of a retrodirective array which radiates a received signal in the direction from which it arrived.

A one dimensional array is depicted in FIG. 1A. The elements located equidistant from the center of the array are connected with transmission lines of equal length. The relative phases of the radiated signals are precisely those required to form a plane wavefront in the direction from which the received signal originated.

The antenna properties of the retrodirective array are identical with those of any array with the exception of the self-steering property. The angle over which the array can effectively receive or transmit signals is governed by the array geometry and the design of the individual elements.

If two retrodirective terminals are located within the field of view of each other as shown in FIG. 1A, an oscillation will be established between them starting from noise. This oscillation can be used as a carrier to transmit information between the two terminals.

The only requirement for establishing an oscillation is that the two terminals be within the field of view of each other such that the net gain around the loop is greater than or equal to unity. This occurs whenever the distance R between the two terminals is less than or equal to that given by $$R = (\lambda/4\pi)\, G_a \sqrt{G_e}$$

where

R = distance between the terminals $\lambda$ = wavelength of the radiation $G_e$ = electronic gain (at each terminal)

$G_a$ = antenna gain (at each terminal) including the array factor. This formula can be derived by equating the power transmitted to the power received around the loop taking into account the space loss, antenna gain, and electronic gain. For an illustrative example, it can be shown that $$R = 4 \sqrt{G_{e1}G_{e2}}\,(D_1\, D_2/\lambda)$$

where

D = dimension of antenna aperture $G_e$ = electronic gain $\lambda$ = wavelength of oscillation.

If $\lambda = 0.1$ ft. (X band), $G_{e1} = G_{e2} = 10^4$, and $D_1 = D_2 = 10$ ft, an illustrative caluclation provides a range of R = 20 miles. It will be understood by one skilled in the art that the range can conveniently be several thousands of miles. The electronic circuitry should be designed in accordance with this invention to separate a desired oscillation frequency from competing frequency modes to optimize the power in the desired frequency.

The following is a heuristic argument for the buildup of oscillations. When the system is first turned on, there is a noise output from each antenna element because of noise received by the associated receiving element and noise locally generated in each amplifier. Each of these noise outputs is assumed to be independent of every other noise output. Because of this, the resultant noise output of the array will be throughout the entire field of view of the array.

Part of this noise output will be received by the opposite array. This received noise will be at a much lower power level than the noise locally generated in the array. However, the received noise can be considered as originating from a point source, and is thus coherent across the receiving aperture. Because of linearity of the system at low power levels, the noise received from the opposite array is returned in the direction from which it was received with the full gain of the array. This process continues so that a carrier oscillation is built up.

The type of build-up will now be described considering the retrodirective oscillating loop of FIG. 3A. Assume that at antenna element 50A there is a signal $X(t) = A\cos(2\pi ft + \phi)$ For a steady-state solution to exist, there must be $$x(t - 2t_d) = x(t)$$

where $t_d$ = one-way delay time = $d/c$ $d$ = separation of terminals $c$ = velocity of propagation.

Using (2) and (3) there results $$A\cos(2\pi ft + \phi - 4\pi ft_d) = A\cos(2\pi ft + \phi) \quad (4)$$

or $$f_m = m(c/2d) \qquad m = 0, 1, 2 \ldots \quad (5)$$

Therefore, oscillations can build up at frequencies (modes) which are multiple of $c/2d$, the basic mode of oscillation.

The following results have been obtained from a detailed analysis of the build-up. The power spectral density is given by $$S_n(\omega)/S_o = 1 + [G^{n+2}/N(G-1)]\{[(G - \cos 2\omega t_d)/(1 + G^2 - 2G\cos 2\omega t_d)],\}G^n >> 1 \quad (6)$$

where $S_n(\omega)$ = power spectral density for time in the interval $$nt_d \leqslant t \leqslant (n+1)t_d$$

$S_o$ — power spectral density of noise input, which is assumed to be narrow-band gaussian noise.
G = one-way power gain of the system
$t_d$ = propagation time between the two terminals
N = number of elements in the array. This function is periodic in $2\omega t_d$. The peak occurs when $$f = m/2t_d = m(c/2d) \qquad m = 0, 1, 2 \ldots$$

as long as the frequency is in the pass band.

The normalized power spectrum for one of the modes is shown in FIG. 2 for G = 1.2. The normalized spectrum is independent of $n$ (or of time) as long as $G^n >> 1$. The power spectrum increases in magnitude with time, but the shape of the spectrum of one of the modes is given by half power width/$f_s$ = 1/180° arc cos $[1 + 2G - G^2/2]$ (7)
where $f_s$ is the spacing between modes = $c/2d$. For gain G close to one, the half power width is small.

The time required to build up the peak of the power spectral density to a value of $PS_o$ is given by $$t = (d/c) [\log [1 + [1 + (P-1)n(G-1)^2 + (G-2) G] ] - \log G], G > 1. \qquad (8)$$

The selection of a single mode from the multiplicity of possible modes occurs because of amplitude limiters which are included in the system. To appreciate the effect of the amplitude limiter circuit, consideration is given to the mode spectrum as a band-limited repetitive noise or an amplitude-and frequency-modulated carrier in the center of the band. As the limiter removes the amplitude modulation, new frequencies will be generated which extend beyond the pass band of the system. These frequencies are used to describe the freqency-modulated carrier. As these frequencies decay, amplitude modulation will appear again. While this interplay of amplitude and band limiting continues, only a single mode will survive.

For an operational system, of course, two different frequencies should desirably be used for the two directions of propagation to achieve isolation. A system is shown in FIG. 3B, which includes two identical oscillators to produce frequency offset.

The equation analogous to (4), which is determined by the fact that the received signal must equal the transmitted one at any point in the steady state, leads to $\cos (2\pi f_{ab}t + \phi - 4\pi f_{ab}(d/c) + 2\pi f_o d/c - \phi_1 + \phi_2) = \cos (2\pi f_{ab}t + \phi)$ (9)

from which $$f_{ab} = (f_o/2) + (\phi_2 \bar{\ } \phi_1/4\ \pi)\ (c/d) \pm (mc/2d) \qquad m = 0, 1, 2 \ldots \qquad (10)$$

or since $f_{ab} - f_{ba} + f_o$ $$f_{ab} + f_{ba}/2 = (\phi_2 \bar{\ } \phi_1/4\pi d)\ c \pm (mc/2K_d) = f_m \qquad (11)$$

which states that the average of the two carrier frequencies represents the equivalent mode frequency which is not affected by the offset frequency. Independent offset oscillators may gradually depart in phase so that the mode frequency will shift. However, stabilizing circuits can be utilized.

Other ways of operating the same system exist. For example, the frequency $f_o$ can be set higher than the carrier frequencies so that frequency inversion takes place. It can be shown that this leads to a desirable situation in that the equivalent mode frequency is one half the difference of the two carrier frequencies. This is advantageous when there is relative motion between the two terminals as the doppler frequency shift is determined by the equivalent mode frequency.

To realize amplification at the intermediate level, local oscillators are required in each terminal for heterodyning. A circuit for heterodyning is shown in FIG. 3C. The local oscillator frequency is subtracted from the received carrier frequency and after amplification the intermediate frequency is subtracted from the local oscillator frequency to form an inverted frequency transmitted carrier whose frequency is offset by twice the intermediate frequency with respect to the receive frequency.

Under stationary conditions the two local oscillators of FIG. 3C should desirably be synchronized so that the phase which is added twice to the received carrier on the right side terminal can be subtracted twice at full amount on the left side terminal. Even with highly stable oscillators, a phase difference of many cycles may rapidly develop. The addition or removal of one cycle means an upward or downward shift, respectively, of the mode frequency by one round trip frequency, i.e., it means a shift to the upper or lower edge of the amplifier pass band, where it can lose the required loop gain and the oscillation may decay.

As the old mode decays, the loop gain in the center of the amplifier pass band will increase and the nearest mode will build up to the limiting level. This will also shift toward the edge of the pass band and decay so that a repetitive mode switching may result. However, circuitry, e.g., voltage stabilized local oscillator can be utilized to achieve a stable mode.

It is noted in the noted copending U.S. Pat. application Ser. No. 710,712 by H. P. Raabe, that when the retrodirective terminals of a retrodirective oscillating loop are not stationary, additional circuitry may be required which synchronizes the local oscillators at the terminals. If the terminals are in relative separating linear motion at constant speed, study of the equivalent mode frequency reveals the nature of the change of carrier frequencies. The oscillating mode maintains the mode cycles in the expanding loop as the mode frequency is received at a downward shift due to Doppler effect as in the transmitted frequency. The mode frequency $f_m$ is related to the distance $d$ between the terminals according to the expression $$f_m = mc/2d$$

where m = c is the velocity of light. It can be shown theoretically that the mode frequency coincides with the intermediate frequency which can be considered to be carried over the propagation paths by a single side band modulated radiofrequency carrier having frequency $$(|f_{ab}| + |f_{ba}|)/2.$$

By utilizing one side band in one direction and the other side band in the opposite direction, the phase effects on the radiofrequency carrier cancel.

By substituting $f_i$ for $f_m$ and $vt$ for $d$ in the expression $f_m = mc/d$ where $v$ is the relative velocity of the separating terminals, there results $f_i = mc/2vt$. To stabilize the intermediate frequency $f_i$, there desirably should be an increase of $m$. Therefore, the number of cycles to be added to the mode is $f_d = m/t = (2n/c) f_i$. The addition of $f_d$ cycles to the mode frequency is readily achieved by an increase of $f_d/2$ in the local oscillator frequency at one retrodirective terminal. This is achieved because $f_d/2$ is added twice to the received carrier on its way to the transmitting antenna element. This result can also be achieved by reducing the local oscillator frequency in the other retrodirective terminal by the amount $f_d/2$.

The antenna array elements of a retrodirective terminal of a retrodirective oscillating loop for the practice of this invention need not be positioned proportionally to the frequency if phase inversion or frequency inversion of the received frequency relative to the transmitted frequency, the electrical propagation path length for an instantaneous plane wavefront should be uniform for all array elements. Therefore, a plane array should have uniform transmission lines with radiating elements being oppositely proportioned. The curvature of a curved transmitting array must be reversed with respect to the curvature, i.e., convex and concave, respectively, of the receiving array. If phase inversion and frequency are unchanged, any additional path length can be inserted before the inverter provided this delay is matched by an additional path length after the inverter. If the received and transmitted frequencies are phase inverted, curved arrays may be convex or concave in both the receiving portion and the transmitting portion. Therefore, array elements can be positioned on the outer side of any closed surface and rotated about an arbitrary axis without causing interference with the retrodirectivity if both the receiving and transmitting arrays are of identical geometry and rigidly connected.

SUMMARY

Generally, the invention involves two remote terminals which achieve contact without specific orientation or bearing being a priori identified. The energy which is incoming to each terminal effectively controls the energy which is outgoing therefrom. The presence of both the incoming and outgoing energy and the phase information communicated from the incoming to the outgoing energy achieves the focusing. Therefore, the invention involves the capability of remote terminals to translate radiant waveform energy from incoming to outgoing by maintaining automatically and temporally relationship or alignment of the waveforms in space relative to a fixed spatial frame regardless of the movement of the terminals themselves.

The alignment of energy in space refers to the aligning of waveform energy in time and at particular point in space which is radiated from specific radiators in a terminal, all of which will have in time sense a similar waveform even though little restriction is made upon the shape of the waveform. The system is capable of this temporal alignment of waveforms of arbitrary shape. The alignment occurs at some point in the far field of the antennas associated with the terminals. Far field means that position away from the antennas associated with the terminals where waves are considered to be plane waves.

An energy transfer system is provided by the invention which is composed of two terminals which are spaced at a distance from one another in arbitrary direction. The terminals provide for the alignment of radiant energy of arbitrary waveform in the space in between them, sufficiently distant from one terminal resulting in a concentration of energy in the direction toward the other terminal. This concentration of energy can be physically measured by placing a receiving probe in this space and moving the probe transversely with respect to the line between the terminals. This concentration of energy is caused by the alignment of the waveforms in space. There is a definite zone or beamwidth of intensive radiation between the terminal. Outside of this zone equal to the beamwidth, there is very little radiation.

The description of the embodiment of this invention and the practice thereof has been presented with respect to retrodirective antenna arrays wherein the receive and transmit elements with appropriate gain and phase information are present. Although the connections between the receive and transmit antenna array elements have been indicated to be physical connections with amplifiers therein, in certain operational circumstances the communication connections may themselves be via electromagnetic radiation channels.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A retrodirective oscillating loop comprising:

first and second remotely located retrodirective antenna array terminals with respective retrodirective properties for received and transmitted propagating electromagnetic waveform energies which are spaced apart by an intervening medium which sustains propagation of said electromagnetic waveform energy, each of said terminals having an effective field of view for a respective noise spectrum and each of said terminals being disposed within the respective effective field of view of the other said terminal to form a communications loop;

means for establishing total loop energy gain equal to or greater than total loop energy loss to cause a carrier waveform to be automatically built up out of noise in said loop without the initial transmission of a carrier from one of said terminals to the other of said terminals; and local oscillator means to provide a frequency difference between received waveforms and transmitted waveforms at at least one of said terminals.

2. A retrodirective oscillating loop as set forth in claim 1 wherein said means at one of said terminals provides a frequency difference between a received waveform and the corresponding transmitted waveform includes:

means for converting the frequency of said received waveform to another frequency;

means for amplifying said other frequency; and means for converting said other frequency to said transmitted frequency.

3. A retrodirective oscillating loop as set forth in claim 2 wherein said other frequency is an intermediate frequency.

4. A retrodirective oscillating loop as set forth in claim 1 wherein said means at one of said terminals to provide a frequency difference between said received waveform and said corresponding transmitted waveform includes:

means connected to a first set of antenna array elements of said one terminal for routing received oscillating signals through one amplifying channel to a second set of antenna array elements of said one terminal for transmission therefrom; and means for routing other received signals at said second set of antenna array elements through another amplifying channel to said first set of antenna array elements for transmission therefrom of another and different frequency than the frequency of said first received waveform.

5. A retrodirective oscillating loop as set forth in claim 1 wherein said means at one of said terminals to provide a frequency difference between said received waveform and said transmitted waveform includes:

a local oscillator;

means for mixing said received waveform with a higher frequency derived from said local oscillator and obtaining the subtracted resulting waveform; and means for transmitting said subtracted resulting waveforms to obtain an effective reversal of relative phase between said received waveforms and said transmitted waveforms.

6. A retrodirective oscillating loop as set forth in claim 5 including:

means for converting the frequency of said received waveform to an intermediate frequency waveform; and means to subtract said intermediate frequency from said local oscillator higher frequency to obtain said transmitted frequency.

7. A retrodirective oscillating loop as set forth in claim 1 wherein said means at one of said terminals to provide a frequency difference between said received waveform and said transmitted waveform includes means to provide a phase inversion between said received waveform and said transmitted waveform at said one terminal only, the phase of the transmitted wave being the same as that of the received wave at the other of said terminals.

8. A retrodirective oscillating loop comprising:

a. first and second remotely located retrodirective antenna array terminals, each terminal having retrodirective properties for transmitting a received waveform within the field of view of the terminal back in the direction from which the waveform was received;

b. each of said retrodirective antenna array terminals being located in the field of view of the other terminal to form an oscillating communications loop in which a signal transmitted by one array terminal is received by the other array terminal and then transmitted back to the first array terminal;

c. each of said antenna array terminals including a plurality of receiver and transmitter elements which are connected to each other by circuits having sufficient gain that the loop energy gain for a signal transmitted around the loop formed by said terminals is greater than the total loop energy loss, and the gain being sufficient that a carrier waveform is automatically built up out of noise in the loop including said first and second remotely located retrodirective antenna array terminals without the initial transmission of a carrier from one of said terminals to the other; and d. said circuits at at least one of said terminals including means to provide a frequency difference between the carrier waveform received at that terminal and the carrier waveform transmitted from that terminal to the other terminal.

9. The oscillating loop of claim 8 wherein means are provided at both of said terminals for providing a frequency difference between the carrier wave form received at that terminal and the carrier waveform transmitted from that terminal back to the other terminal.

10. The oscillating loop of claim 9 wherein at one of said terminals the circuits connecting the receiver and transmitter elements, which include the means for providing a frequency difference between the received waveform and the transmitted waveform, provides a net inversion of the phase of the received waveform so that the phase of the carrier waveform transmitted from the elements at that terminal is inverted from the phase of the carrier waveform received by the elements at that terminal.

11. The oscillating loop of claim 10 wherein at the other of said terminals the circuits connecting the receiver and transmitter elements, which provide a frequency difference between the received waveform and the transmitted waveform, cause the transmitted carrier waveform to be transmitted without a net inversion of phase from the phase of the received waveform.

12. The oscillating loop of claim 11 wherein the circuits connecting the receiver and transmitter elements at said other terminal includes two local oscillators at which the carrier waveform is subtracted from a high frequency.

13. The oscillating loop of claim 8 wherein said circuits include phase inversion means for stabilizing the frequencies of the carrier waveform built up in said loop against changes due to Doppler shift and local oscillator drift.

14. The oscillating loop of claim 8 wherein said circuits invert the phase of the received carrier waveform and transmit the carrier wave form with inverted phase at one only of said terminals.

15. The oscillating loop of claim 8 including a repeater for causing each of said terminals to be in the field of view of the other terminal and said communications loop includes said repeater.

16. A retrodirective oscillating loop comprising:

first and second remotely located retrodirective antenna array terminals with respective retrodirective properties for received and transmitted propagating electromagnetic waveform energies which are spaced apart by an intervening medium which sustains propagation of said electromagnetic waveform energy, each of said terminals having an effective field of view for a respective noise spectrum and each of said terminals being disposed within the respective effective field of view of the other said terminal to form a communications loop; and means for establishing total loop energy gain equal to or greater than total loop energy loss to cause a carrier waveform to be automatically built up out of noise in said loop without the initial transmission of a carrier from one of said terminals to the other of said terminals.

* * * * *